(12) United States Patent
Chae et al.

(10) Patent No.: US 11,006,247 B2
(45) Date of Patent: May 11, 2021

(54) METHOD FOR TRANSMITTING POSITIONING INFORMATION BY TERMINAL IN WIRELESS COMMUNICATION SYSTEM SUPPORTING SIDELINK, AND DEVICE THEREFOR

(71) Applicant: LG Electronics Inc., Seoul (KR)

(72) Inventors: Hyukjin Chae, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/753,674

(22) PCT Filed: Oct. 29, 2018

(86) PCT No.: PCT/KR2018/012931
§ 371 (c)(1),
(2) Date: Apr. 3, 2020

(87) PCT Pub. No.: WO2019/083344
PCT Pub. Date: May 2, 2019

(65) Prior Publication Data
US 2020/0267507 A1    Aug. 20, 2020

Related U.S. Application Data

(60) Provisional application No. 62/577,750, filed on Oct. 27, 2017.

(51) Int. Cl.
*H04W 24/00* (2009.01)
*H04W 4/029* (2018.01)
(Continued)

(52) U.S. Cl.
CPC ........... *H04W 4/029* (2018.02); *H04L 5/0048* (2013.01); *H04M 1/72519* (2013.01); *H04M 1/72522* (2013.01); *H04W 88/02* (2013.01)

(58) Field of Classification Search
CPC .... H04W 4/029; H04W 88/02; H04L 5/0048; H04M 1/72519; H04M 1/72522
(Continued)

(56) References Cited

U.S. PATENT DOCUMENTS 9,625,624 B2 * 4/2017 Oh ....................... G02B 3/0037
10,735,225 B2 * 8/2020 Kim .................. H04L 25/03834
(Continued)

FOREIGN PATENT DOCUMENTS

KR         101170723       8/2012
KR         20160008045     1/2016
WO       WO 2017/083414    5/2017

OTHER PUBLICATIONS

PCT International Search Report in International Appln. No. PCT/KR2018/012931, dated Jan. 7, 2019, 18 pages (with English translation).
(Continued)

*Primary Examiner* — Danh C Le
(74) *Attorney, Agent, or Firm* — Fish & Richardson P.C.

(57) ABSTRACT

Disclosed are a method for a terminal transmitting positioning information in a wireless communication system supporting sidelink and a device therefor according to various embodiments. Disclosed are a method for a terminal transmitting positioning information and a device therefor, the method comprising the steps of: receiving, from a network or a transmission terminal, a positioning signal comprising N consecutive tones to which reference signals are mapped; measuring the phase difference between a reference signal, which is mapped to an anchor tone which is a reference among the N consecutive tones, and the reference signals respectively mapped to the remaining tones; and transmitting, to the network or the transmission terminal, positioning information comprising information relating to the measured phase difference, wherein the positioning information
(Continued)

comprises information relating to the sum of the measured phase differences between the reference signals.

16 Claims, 27 Drawing Sheets

(51) Int. Cl.
    *H04L 5/00*         (2006.01)
    *H04M 1/725*     (2021.01)
    *H04W 88/02*     (2009.01)

(58) Field of Classification Search
    USPC .................. 455/456.1, 456.5, 456.6, 418
    See application file for complete search history.

(56) References Cited

U.S. PATENT DOCUMENTS

| | | |
|---|---|---|
| 2004/0150387 A1 | 8/2004 | Lyon et al. |
| 2011/0043407 A1 | 2/2011 | Moshfeghi |
| 2016/0134402 A1 | 5/2016 | Park et al. |
| 2017/0134199 A1* | 5/2017 | Wang .................... H04L 5/0012 |
| 2017/0318559 A1* | 11/2017 | Islam ................... H04W 72/005 |
| 2018/0091350 A1* | 3/2018 | Akkarakaran ........ H04L 5/0053 |
| 2018/0115446 A1* | 4/2018 | Adhikary ............ H04L 25/0226 |
| 2018/0115448 A1* | 4/2018 | Ramanujam .......... H04L 5/0048 |
| 2018/0316472 A1* | 11/2018 | John Wilson ......... H04W 76/15 |
| 2019/0036746 A1* | 1/2019 | Hwang ................. H04L 1/0061 |
| 2019/0059012 A1* | 2/2019 | Nam .................... H04W 24/08 |
| 2020/0236495 A1* | 7/2020 | Lee ....................... H04W 24/10 |
| 2020/0244503 A1* | 7/2020 | Bala ..................... H04L 5/0007 |

OTHER PUBLICATIONS

EP Extended European Search Report in European Appln. No. 18870232.8, dated Apr. 1, 2021, 7 pages.

* cited by examiner

FIG. 5
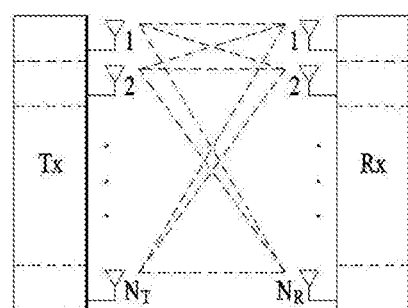
(a)
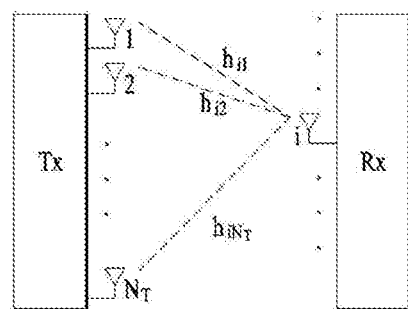
(b)

FIG. 8
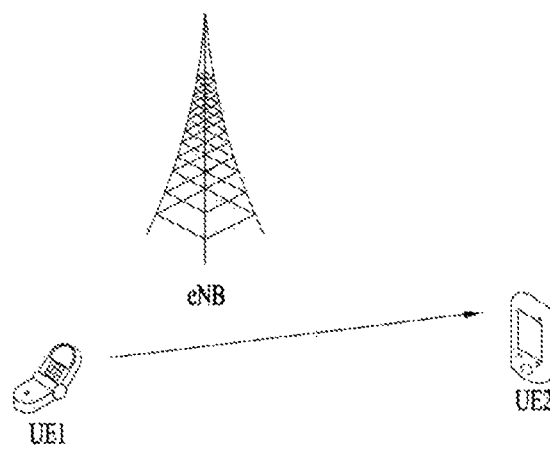
(a)
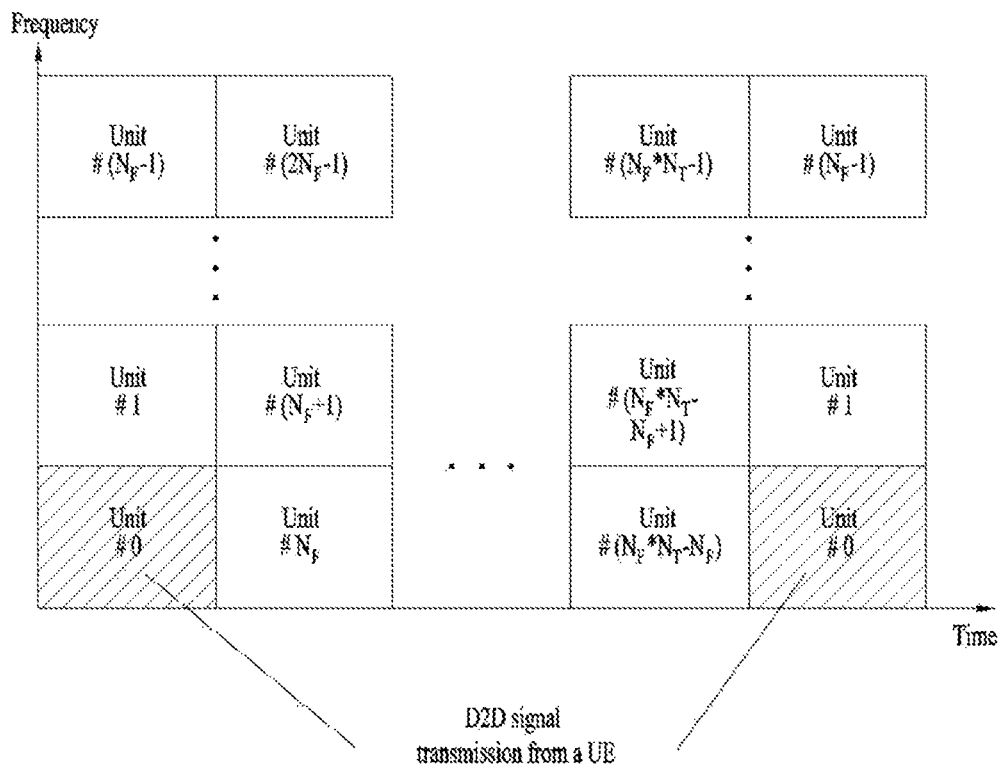
(b)

FIG. 9
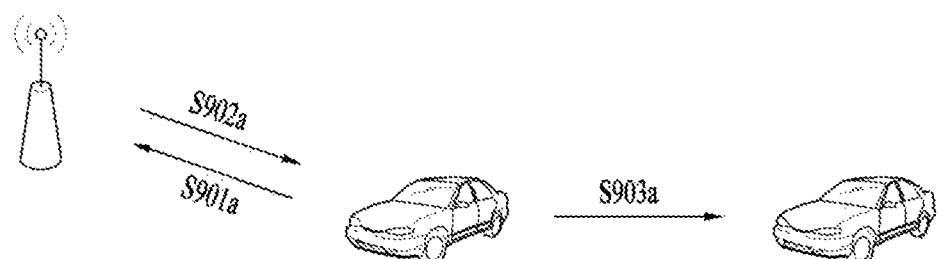
(a)
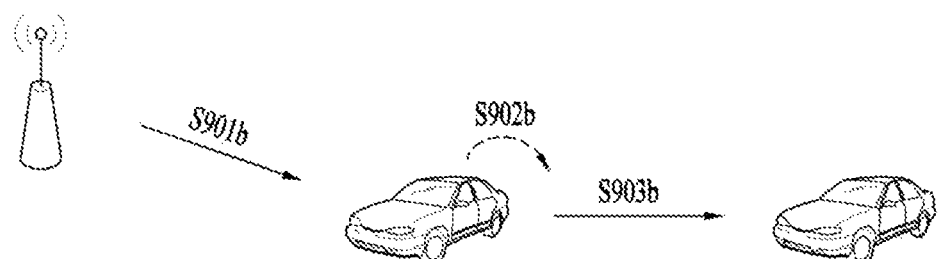
(b)

FIG. 12
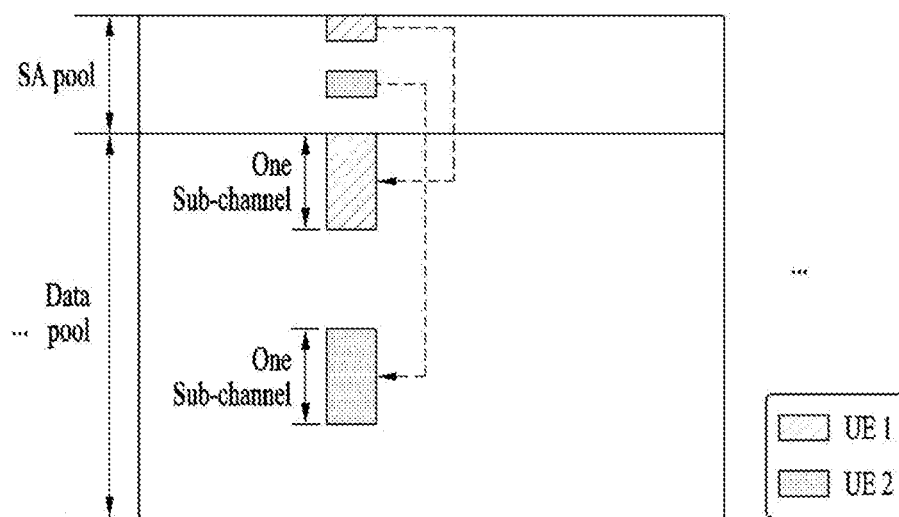
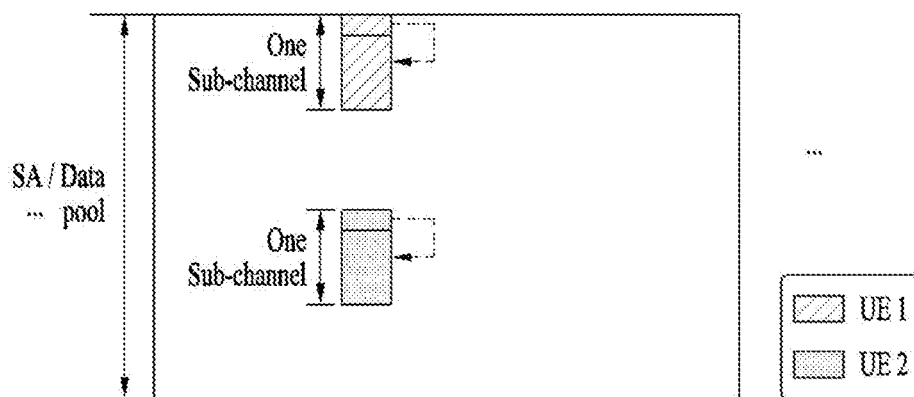

FIG. 14
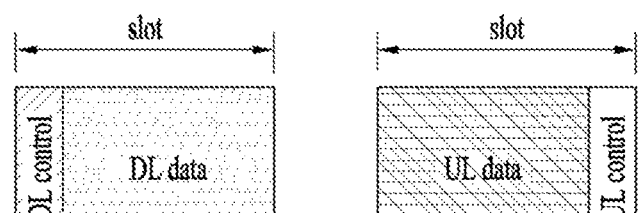
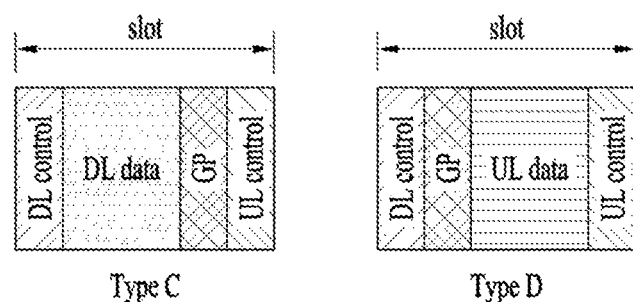

FIG. 16
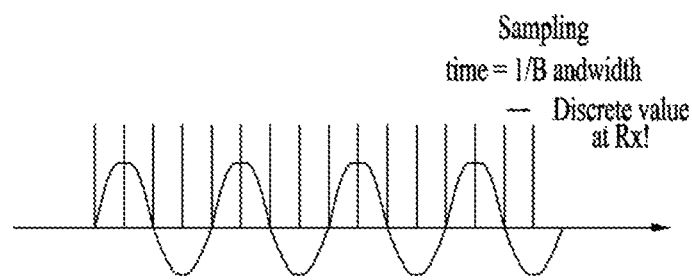
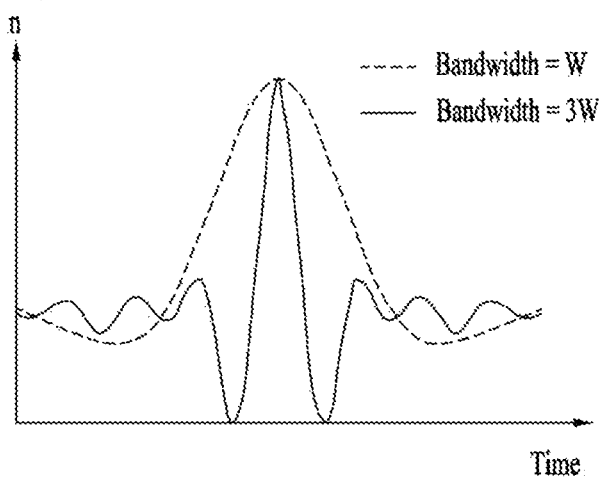

METHOD FOR TRANSMITTING POSITIONING INFORMATION BY TERMINAL IN WIRELESS COMMUNICATION SYSTEM SUPPORTING SIDELINK, AND DEVICE THEREFOR

CROSS-REFERENCE TO RELATED APPLICATIONS

This application is a National Stage application under 35 U.S.C. § 371 of International Application No. PCT/KR2018/012931, filed on Oct. 29, 2018, which claims the benefit of U.S. Provisional Application No. 62/577,750, filed on Oct. 27, 2017. The disclosures of the prior applications are incorporated by reference in their entirety.

TECHNICAL FIELD

The present disclosure relates to a wireless communication system supporting sidelink, and more particularly, to a method by which a terminal transmits positioning information measured based on reference signals in a wireless communication system supporting sidelink communication, i.e., device-to-device (D2D) communication and device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An object of the present disclosure is to avoid estimating distance information from ambiguous phase difference information by determining any one of a plurality of consecutive tones as an anchor tone, calculating phase differences between reference signals with respect to a reference signal included in the anchor tone, and transmitting to a base station positioning information including information on the calculated phase differences.

Another object of the present disclosure is to minimize phase errors, which depend on channel selectivity, by changing the anchor tone based on the channel selectivity.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of transmitting positioning information by a user equipment (UE) in a wireless communication system supporting sidelink. The method may include receiving a positioning signal including N consecutive tones to which reference signals are mapped from a network or a transmitting UE, measuring phase differences between a reference signal mapped to an anchor tone, which corresponding to a standard tone, among the N consecutive tones and reference signals respectively mapped to the remaining tones, and transmitting the positioning information including information on the measured phase differences to the network or the transmitting UE. The positioning information may include information on the sum of the measured phase differences between the reference signals.

Alternatively, any one of the N consecutive tones may be determined as the anchor tone based on the selectivity of a channel carrying the positioning signal.

Alternatively, either a first tone or an N-th tone among the N consecutive tones may be determined as the anchor tone.

Alternatively, an N/2-th tone among the N consecutive tones may be determined as the anchor tone.

Alternatively, the anchor tone may be predetermined by a base station or the transmitting UE based on the selectivity of a channel carrying the positioning signal.

Alternatively, the information on the sum of the phase differences between the reference signals may correspond to information on a phase difference between reference signals mapped to two tones with a virtual frequency interval, and the virtual frequency interval may be greater than the maximum frequency difference between the N tones.

Alternatively, the positioning information may include information on the sum of the absolute values of the measured phase differences between the reference signals.

Alternatively, the UE may select M consecutive tones from among the N consecutive tones included in the positioning signal, and M may be an integer less than N.

Alternatively, the UE may determine the anchor tone from among the M consecutive tones based on the selectivity of a channel carrying the positioning information, and the positioning information may further include information on the value of M and the determined anchor tone.

In another aspect of the present disclosure, provided herein is a method of transmitting a positioning signal including reference signals by a network in a wireless communication system supporting sidelink. The method may include mapping the reference signals to N consecutive tones, respectively, transmitting the positioning signal including the N consecutive tones to a UE, and receiving positioning information including information on phase differences between a reference signal mapped to an anchor tone corresponding to a standard tone among the N consecutive tones and reference signals respectively mapped to the remaining tones, wherein the phase differences are measured by the UE. The positioning information may include information on the sum of the measured phase differences between the reference signals.

Alternatively, the reference signals mapped to the N consecutive tones may have the same phase information.

Alternatively, the sum of the phases of the reference signals mapped to the N consecutive tones may be predetermined.

Alternatively, the positioning signal may be transmitted by allocating the highest transmit power to the anchor tone among the N consecutive tones.

Alternatively, the positioning signal may be transmitted by allocating the highest transmit power to a first tone and an N-th tone among the N consecutive tones. In some implementations, the processor may be configured to receive a user input to switch the drive mode from an autonomous mode to a manual mode, or to switch from a manual mode to an autonomous mode.

Advantageous Effects

According to the present disclosure, any one of a plurality of consecutive tones may be determined as an anchor tone, phase differences between reference signals may be calculated with respect to a reference signal included in the anchor tone, and positioning information including information on the calculated phase differences may be transmitted to a base station, thereby avoiding estimating distance information from ambiguous phase difference information.

According to the present disclosure, the anchor tone may be changed based on channel selectivity, thereby minimizing phase errors that depend on the channel selectivity.

According to the present disclosure, information on the sum of the measured phase differences between the reference signals may be transmitted, and thus, a network may estimate distance information more accurately from the information on the sum of the phase differences.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings:

FIG. 5 is a view illustrating the configuration of a wireless communication system having multiple antennas;

FIG. 8 is a view illustrating an exemplary D2D resource pool for D2D communication;

FIG. 9 is a view referred to for describing transmission modes and scheduling schemes for vehicle-to-everything (V2X);

FIG. 12 is a view referred to for describing an SA and data transmission in V2X;

FIGS. 13 and 14 is a view illustrating a new radio access technology (NRAT) frame structure;

FIG. 16 is a conceptual diagram illustrating a method of measuring a distance based on correlation in the time domain;

BEST MODE

Figure 1:
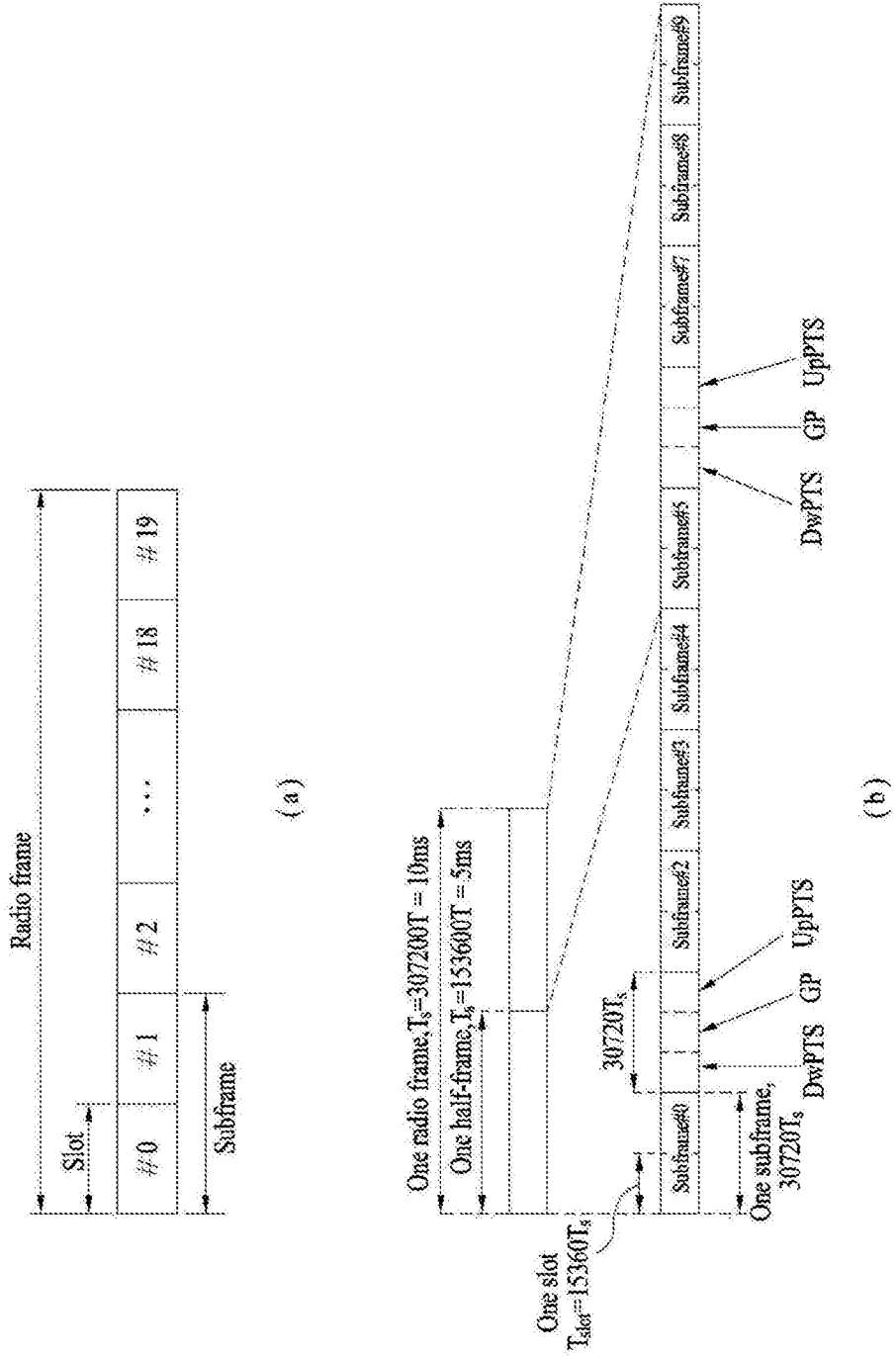
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
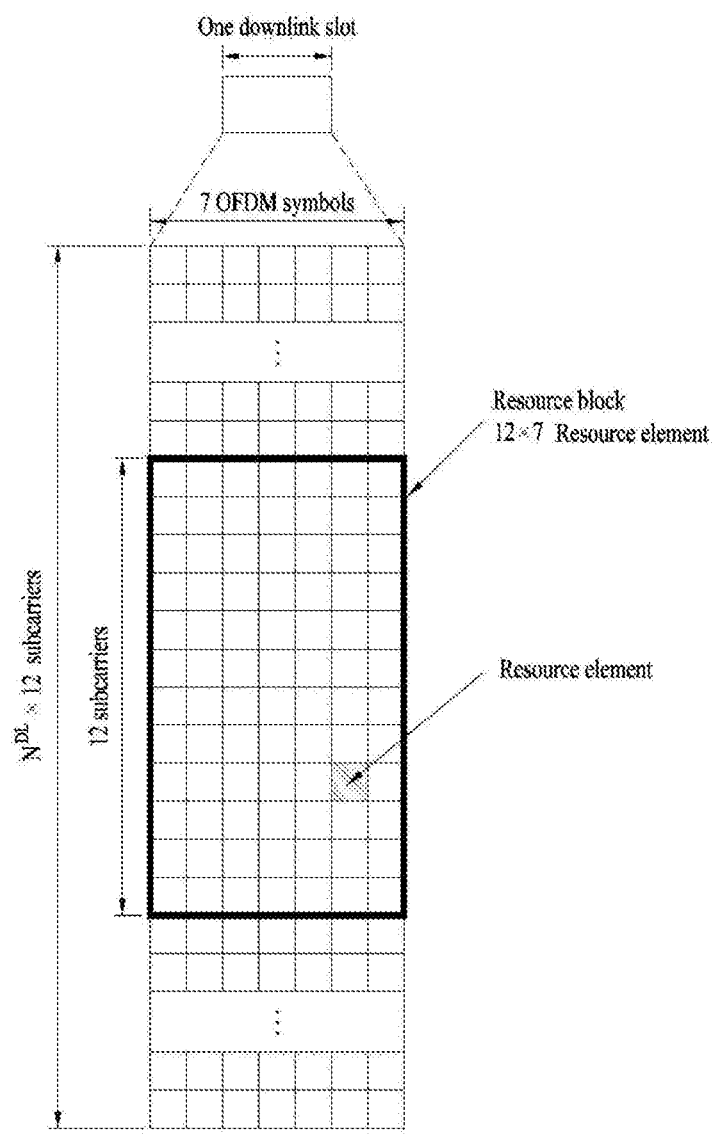
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
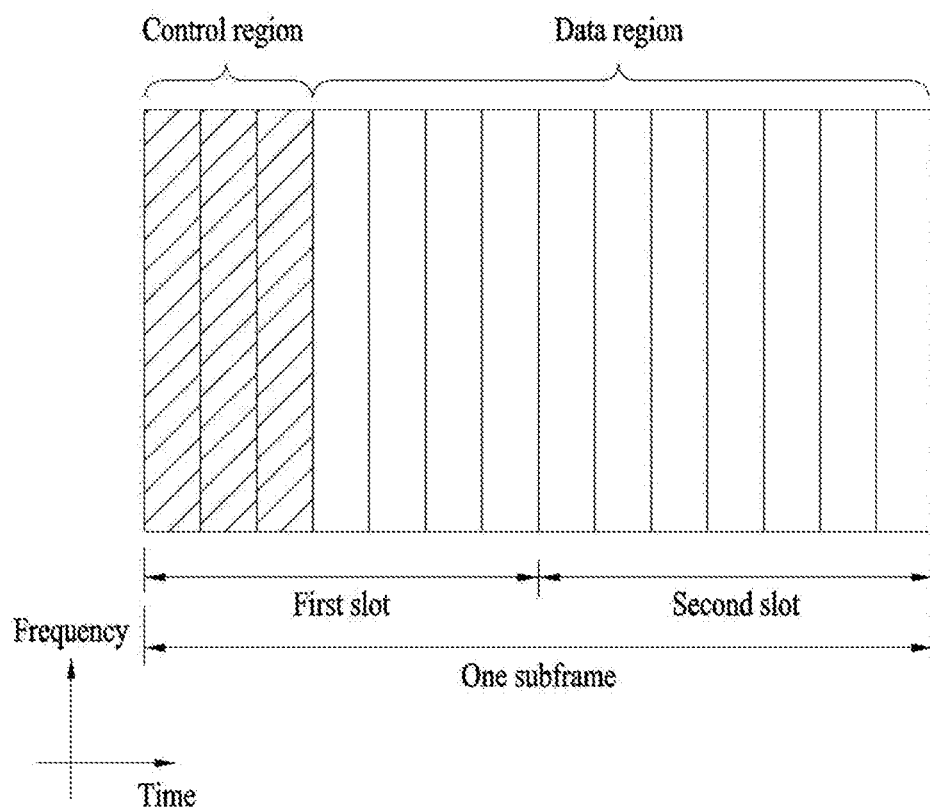
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
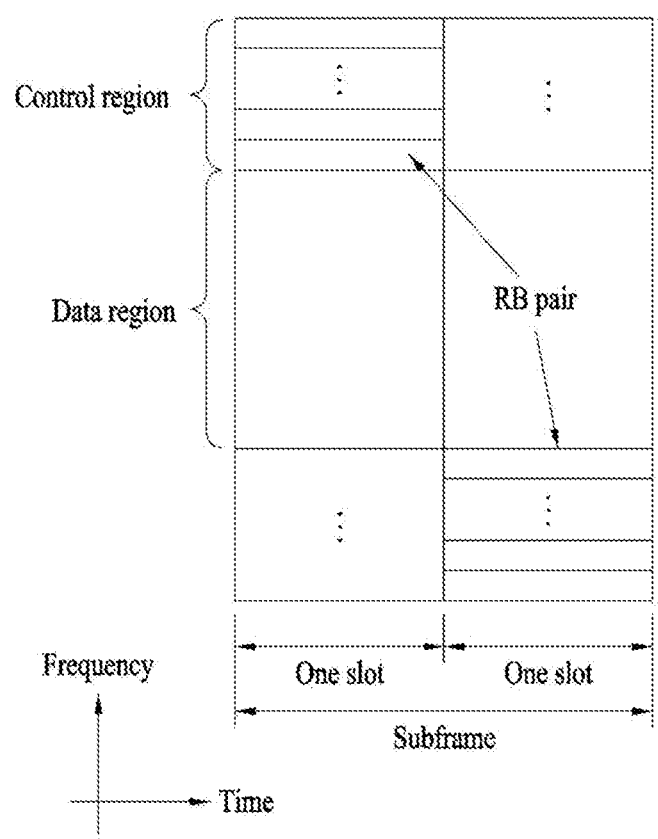
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iT} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iT} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
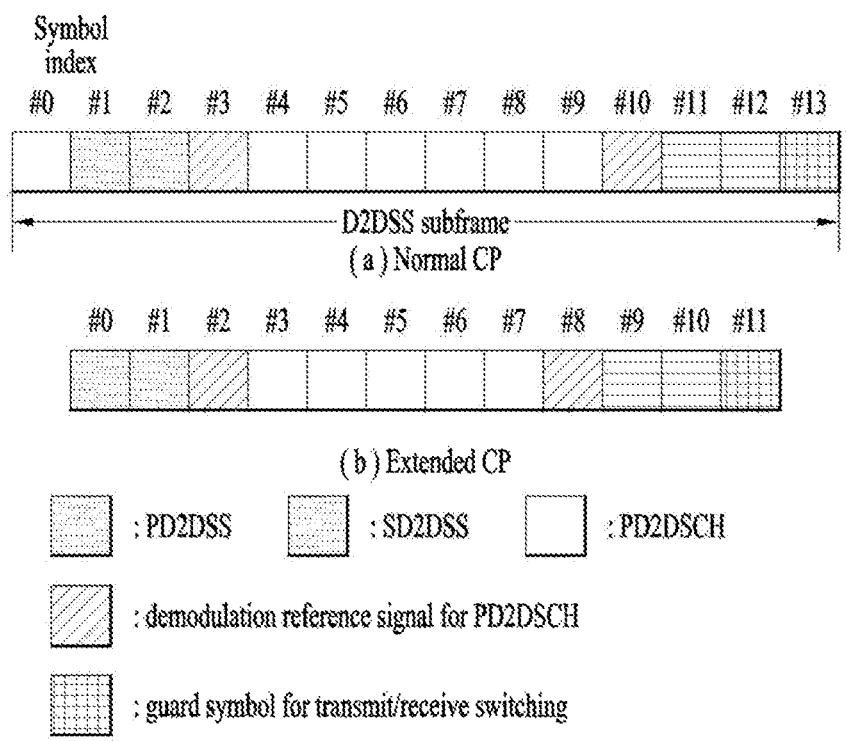
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
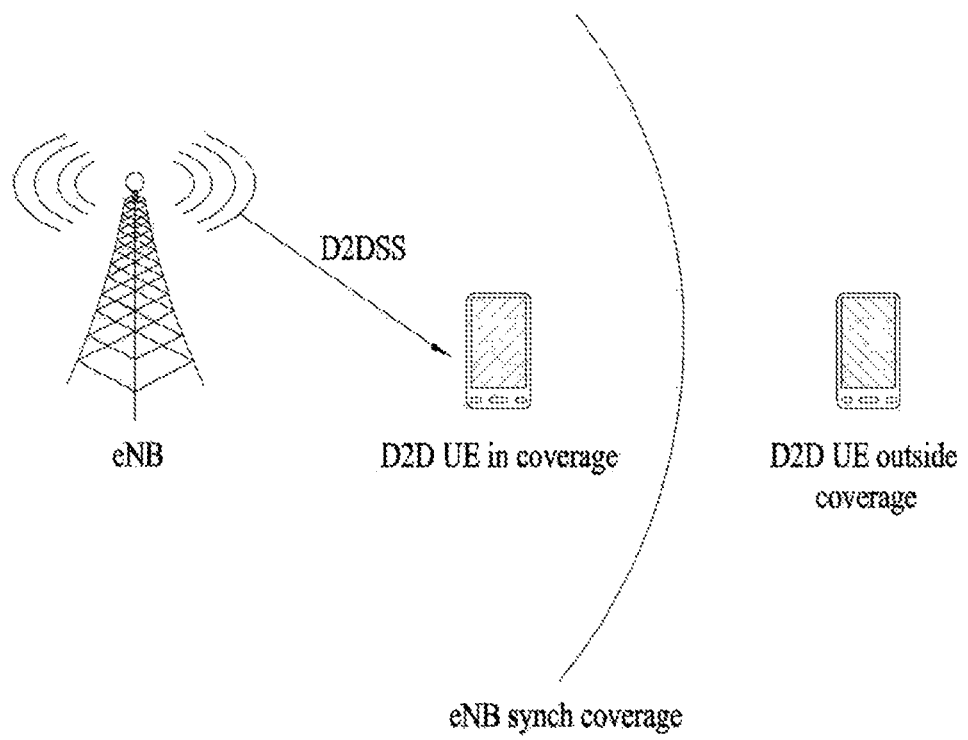
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F * N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 10:
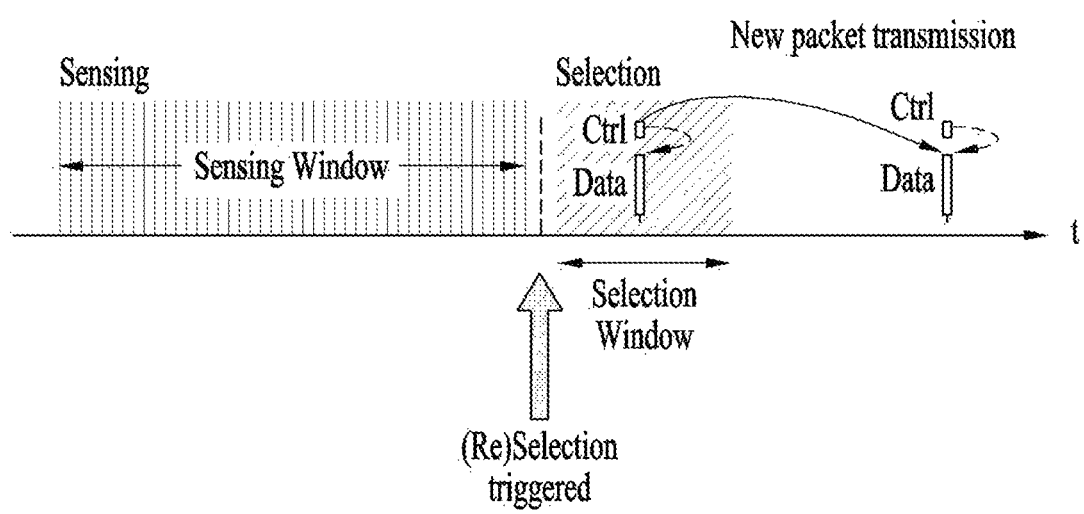
FIG. 10 is a view illustrating a method of selecting resources in V2X.
Figure 11:
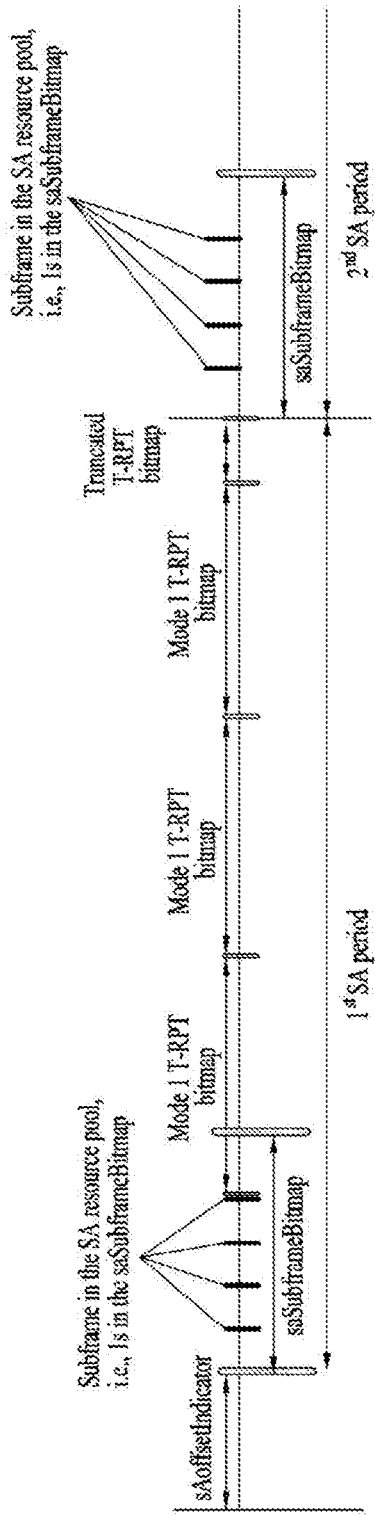
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

NR (New RAT (Radio Access Technology))

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
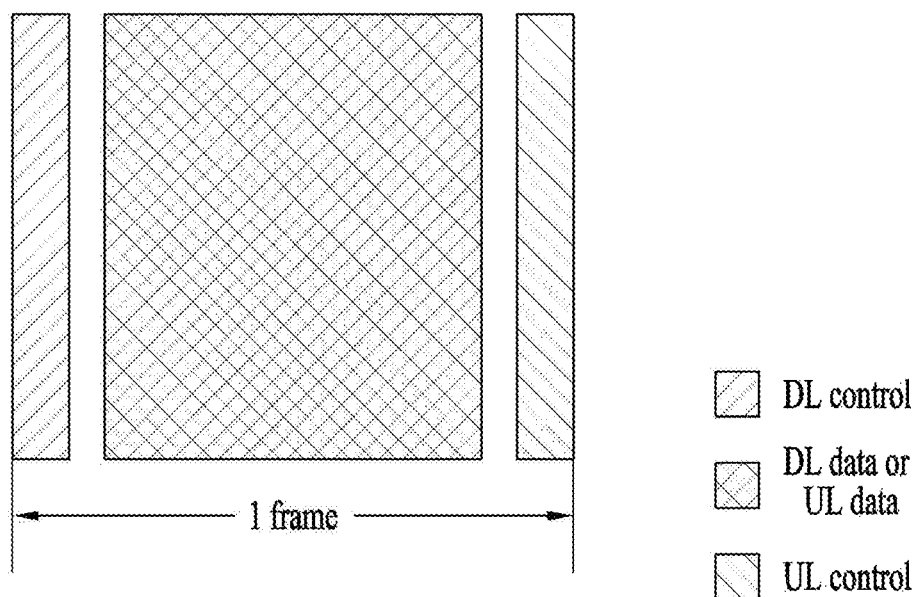

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like)

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP Rel. 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

OTDOA (Observed Time Difference of Arrival)

Figure 15:
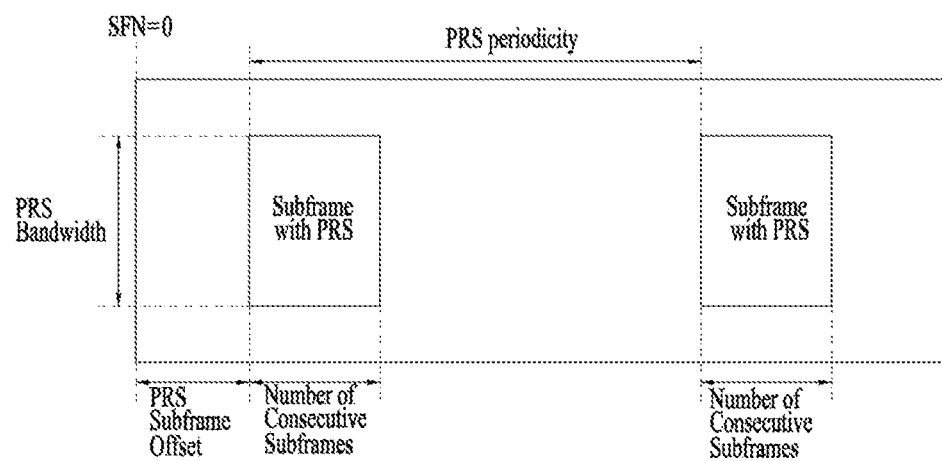
FIG. 15 is a diagram illustrating a positioning reference signal (PRS) transmission structure based on parameters in PRS-Info.

FIG. 15 is a diagram illustrating a positioning reference signal (PRS) transmission structure based on parameters in PRS-Info.

Generally, in cellular communication systems, a network (or a location server) may use various methods to obtain information on the location of a UE. In the LTE system, a UE is configured with information on PRS transmission at eNBs through a higher layer signal. The UE measures PRSs transmitted from neighbor cells thereof and transmits a reference signal time difference (RSTD), which is a reception time difference between a PRS transmitted from a reference eNB and a PRS transmitted from a neighbor eNB, to an eNB or the network (or location server).

The RSTD refers to a relative timing difference between neighbor cell j (or eNB j) and reference cell i (or eNB i) and is defined as '$T_{SubframeRxj} - T_{SubframeRxi}$', where $T_{SubframeRxj}$ denotes the time at which the UE receives the start of one subframe from cell j and $T_{SubframeRxi}$ denotes the time at which the UE receives the start of one subframe from cell i that is closest to a subframe received from cell j. The reference point for the observed subframe time difference may be an antenna connector of the UE. The UE may use a UE reception-transmission (Rx-Tx) time difference to calculate the RSTD. The UE Rx-Tx time difference is defined as '$T_{UE-RX} - T_{UE-TX}$', where $T_{UE-RX}$ is the UE received timing of DL radio frame #i from a serving cell, which is defined by the first detected path in time, and $T_{UE-TX}$ is the UE transmitted timing of UL radio frame #i. The reference point for measuring the UE Rx-Tx time difference may be the antenna connector of the UE.

The network calculates the location of the UE based on the RSTD and other information. Such a positioning scheme for the UE is called observed time difference of arrival (OTDOA) based positioning. Hereinafter, the OTDOA based positioning will be described in detail.

The network calculates the location of the UE based on the RSTD and other information. Such a positioning scheme for the UE is called OTDOA based positioning. Hereinafter, the OTDOA based positioning will be described in detail.

A PRS has a transmission opportunity, i.e. a positioning occasion with a periodicity of 160, 320, 640, or 1280 ms. The PRS may be transmitted during $N_{PRS}$ consecutive DL subframes in the positioning occasion, where $N_{PRS}$ may be 1, 2, 4, or 6. Although the PRS is substantially transmitted in the positioning occasion, the PRS may be muted in the positioning occasion for inter-cell interference coordination. In other words, if zero transmission power is allocated to REs to which the PRS is mapped in the positioning occasion, the PRS may be transmitted with zero transmission power on PRS REs. Information about PRS muting is provided to the UE as prs-MutingInfo. The transmission bandwidth of the PRS may be configured independently unlike the system bandwidth of a serving eNB.

For PRS measurement, the UE receives configuration information on the list of PRSs that the UE should discover from a location management server (e.g. an enhanced serving mobile location center (E-SMLC) or a secure user plane location (SUPL) platform) of the network. The configuration information includes PRS configuration information of a reference cell and PRS configuration information of neighbor cells. The PRS configuration information includes a positioning occasion periodicity, an offset, the number of consecutive DL subframes constituting one positioning occasion, a cell ID used in PRS sequence generation, a CP type, and the number of CRS antenna ports considered in PRS mapping. The PRS configuration information of neighbor cells includes slot offsets and subframe offsets of the neighbor and reference cells, an expected RSTD, and a degree of uncertainty of the expected RSTD. The PRS configuration information of neighbor cells may allow the UE to determine at which time and in which time window the UE should discover PRSs transmitted from the neighbor cells to detect the corresponding PRSs.

As described above, the LTE system has introduced the OTDOA scheme in which eNBs transmit PRSs and a UE estimates an RSTD from the PRSs based on a time difference of arrival (TDOA) scheme and then transmits the estimated RSTD to a network (or a location server). In the LTE system, an LTE positioning protocol (LPP) has been defined to support the OTDOA scheme. The LPP is terminated between a target device and the location server. The target device may be a UE in a control plane or an SUPL-enabled terminal (SET) in a user plane. The location server may be an E-SMLC in the control plane or an SUPL location platform (SLP) in the user plane. The LPP informs the UE of OTDOA-ProvideAssistanceData with the following configuration as an information element (IE).

TABLE 1

```
-- ASN1START
OTDOA-ProvideAssistanceData ::= SEQUENCE {
    otdoa-ReferenceCellInfo    OTDOA-ReferenceCellInfo      OPTIONAL,   -- Need ON
    otdoa-NeighbourCellInfo    OTDOA-NeighbourCellInfoList  OPTIONAL,   -- Need ON
    otdoa-Error                OTDOA-Error                  OPTIONAL,   -- Need ON
    ...
}
-- ASN1STOP
```

TABLE 2

```
-- ASN1START
OTDOA-ReferenceCellInfo ::= SEQUENCE {
    physCellId                  INTEGER (0..503),
    cellGlobalId                ECGI                         OPTIONAL,   -- Need ON
    earfcnRef                   ARFCN-ValueEUTRA             OPTIONAL,   -- Cond
NotSameAsServ0
    antennaPortConfig           ENUMERATED {ports1-or-2, ports4, ... }
                                                             OPTIONAL,             -- Cond
NotSameAsServ1
    cpLength                    ENUMERATED { normal, extended, ... },
    prsInfo       PRS-Info                                   OPTIONAL,             -- CondPRS
    ...,
    [[ earfcnRef-v9a0 ARFCN-ValueEUTRA-v9a0                  OPTIONAL               -- Cond
NotSameAsServ2
    ]]
}
-- ASN1STOP
```

In Table 1, OTDOA-NeighbourCellInfo denotes target cells (e.g. eNBs or TPs) for RSTD measurement.

Referring to Table 2, OTDOA-NeighbourCellInfo may include information about a maximum of 24 neighbor cells for each frequency layer with respect to a maximum of three frequency layers. That is, OTDOA-NeighbourCellInfo may indicate information about a total of 72 (=3*24) cells to the UE.

TABLE 3

```
-- ASN1START
OTDOA-NeighbourCellInfoList ::= SEQUENCE (SIZE (1..maxFreqLayers))
OF OTDOA-NeighbourFreqInfo
OTDOA-NeighbourFreqInfo ::= SEQUENCE (SIZE (1..24)) OF
OTDOA-NeighbourCellInfoElement
OTDOA-NeighbourCellInfoElement ::= SEQUENCE {
    physCellId             INTEGER (0..503),
    cellGlobalId           ECGI                       OPTIONAL,    -- Need ON
    earfcn                 ARFCN-ValueEUTRA           OPTIONAL,    -- Cond
NotSameAsRef0
    cpLength               ENUMERATED {normal, extended, ...}
                                                      OPTIONAL,    -- Cond
NotSameAsRef1
    prsInfo      PRS-Info                             OPTIONAL,    -- Cond NotSameAsRef2
```

TABLE 3-continued

```
    antennaPortConfig           ENUMERATED {ports-1-or-2, ports-4, ...}
                                                    OPTIONAL,   -- Cond
NotsameAsRef3
    slotNumberOffset            INTEGER (0..19)OPTIONAL,   -- Cond NotSameAsRef4
    prs-SubframeOffset          INTEGER (0..1279)      OPTIONAL,   -- Cond InterFreq
    expectedRSTD                INTEGER (0..16383),
    expectedRSTD-Uncertainty    INTEGER (0..1023),
    ...,
    [[ earfcn-v9a0       ARFCN-ValueEUTRA-v9a0 OPTIONAL    -- Cond NotSameAsRef5
    ]]
}
maxFreqLayers INTEGER ::= 3
-- ASN1STOP
```

Herein, PRS-Info, which is an IE included in OTDOA-ReferenceCellInfo and OTDOA-NeighbourCellInfo, contains PRS information. Specifically, PRS bandwidth, PRS configuration index $I_{PRS}$, the number of consecutive DL subframes $N_{PRS}$, and PRS muting information may be included in PRS-Info as follows.

TABLE 4

```
-- ASN1START
PRS-Info ::= SEQUENCE {
    prs-Bandwidth          ENUMERATED { n6, n15, n25, n50, n75, n100, ... },
    prs-ConfigurationIndex INTEGER (0..4095),
    numDL-Frames           ENUMERATED {sf-1, sf-2, sf-4, sf-6, ...},
    ...,
    prs-MutingInfo-r9      CHOICE {
        po2-r9             BIT STRING (SIZE(2)),
        po4-r9             BIT STRING (SIZE(4)),
        po8-r9             BIT STRING (SIZE(8)),
        po16-r9 BIT STRING (SIZE(16)),
        ...,
    }                      OPTIONAL      -- Need OP
}
-- ASN1STOP
```

Referring to FIG. 15, a PRS periodicity $T_{PRS}$ and a PRS subframe offset $\Delta PRS$ are determined depending on the value of a PRS configuration index $I_{PRS}$ (prs-ConfigurationIndex). The PRS configuration index $I_{PRS}$, the PRS periodicity $T_{PRS}$, and the PRS subframe offset $\Delta PRS$ are given as shown in the following table.

TABLE 5

| PRS Configuration Index $I_{PRS}$ | PRS Periodicity $T_{PRS}$ (subframes) | PRS Subframe Offset $\Delta PRS$ (subframes) |
|---|---|---|
| 0~159 | 150 | $I_{PRS}$ |
| 160~479 | 320 | $I_{PRS}$ − 160 |
| 480~1119 | 640 | $I_{PRS}$ − 480 |
| 1120~2399 | 1280 | $I_{PRS}$ − 1120 |
| 2400~4095 | | Reserved |

Among the $N_{PRS}$ DL subframes with the PRS, the first subframe satisfies the following equation: $10*n_f+\text{floor}(n_s/2)-\Delta_{PRS}) \mod T_{PRS}=0$. Herein, $n_f$ is a radio frame number and $n_s$ is a slot number in a radio frame.

To obtain location-related information for supporting a DL positioning scheme, the location server (e.g. E-SMLC) may interact with any eNB reachable from mobility management entities (MMES) having signaling access to the location server. The location related information may include timing information for the eNB in relation to an absolute global navigation satellite system (GNSS) time or timings of other eNB(s) and information about supported cells including PRS schedule. A signal between the location server and the eNB is transmitted through any MME with signaling access to both the location server and the eNB.

In addition to the DL positioning scheme in which a target UE calculates a measurement metric by measuring PRSs transmitted by eNBs, there is a UL positioning scheme in which eNBs measure a signal transmitted by a UE. The UL positioning scheme is based on an uplink time difference of arrival (UTDOA) between UL signals. To support UL positioning, the location server (e.g. E-SMLC) may interact with the serving eNB of the UE to retrieve target UE configuration information. The configuration information includes information required by location measurement units (LMUs) to obtain UL time measurements. The LMUs correspond to eNBs that read a signal transmitted by the UE for the UL positioning. The location server informs the serving eNB that the UE needs to transmit an SRS (up to a maximum SRS bandwidth available for carrier frequency) for the UL positioning. If requested resources are not available, the serving eNB may allocate other resources and feed the allocated resources back to the location server. If there are no available resources, the serving eNB may inform the location server of the fact that there are no available resources.

The location server may request a plurality of LMUs to perform UL time measurement and feed back the measurement results. In the UL positioning, the location of the UE is estimated based on timing measurements of UL radio signals received by different LMUs together with knowledge of geographical coordinates of the different LMUs. The time required for a signal transmitted by the UE to reach an LMU is proportional to the length of a transmission path between the UE and the LMU. A group of LMUs measure a UTDOA by simultaneously sampling UE signals.

Phase Difference Measurement Feedback for Network Based Positioning

The present disclosure is directed to a method of measuring a distance between wireless communication devices and locations thereof, and more particularly, to a method of measuring a distance between devices corresponding to distance measurement targets based on phase information about radio signals transmitted and received therebetween. For convenience of description, it is assumed that two frequencies are used for signal transmission and reception, but the present disclosure is not limited thereto. That is, the present disclosure is applicable when the number of frequencies varies. In the present disclosure, it is assumed that transmission is simultaneously performed on multiple frequencies. However, transmission may be performed at predetermined different times, and the principles of the present disclosure are applicable in consideration thereof.

FIG. 16 is a conceptual diagram illustrating a method of measuring a distance based on correlation in the time domain. Referring to FIG. 16, time-domain resolution is determined depending on sampling rates in the time domain. In addition, as a bandwidth increases, the accuracy of measuring a time difference in the time domain may increase.

Figure 17:
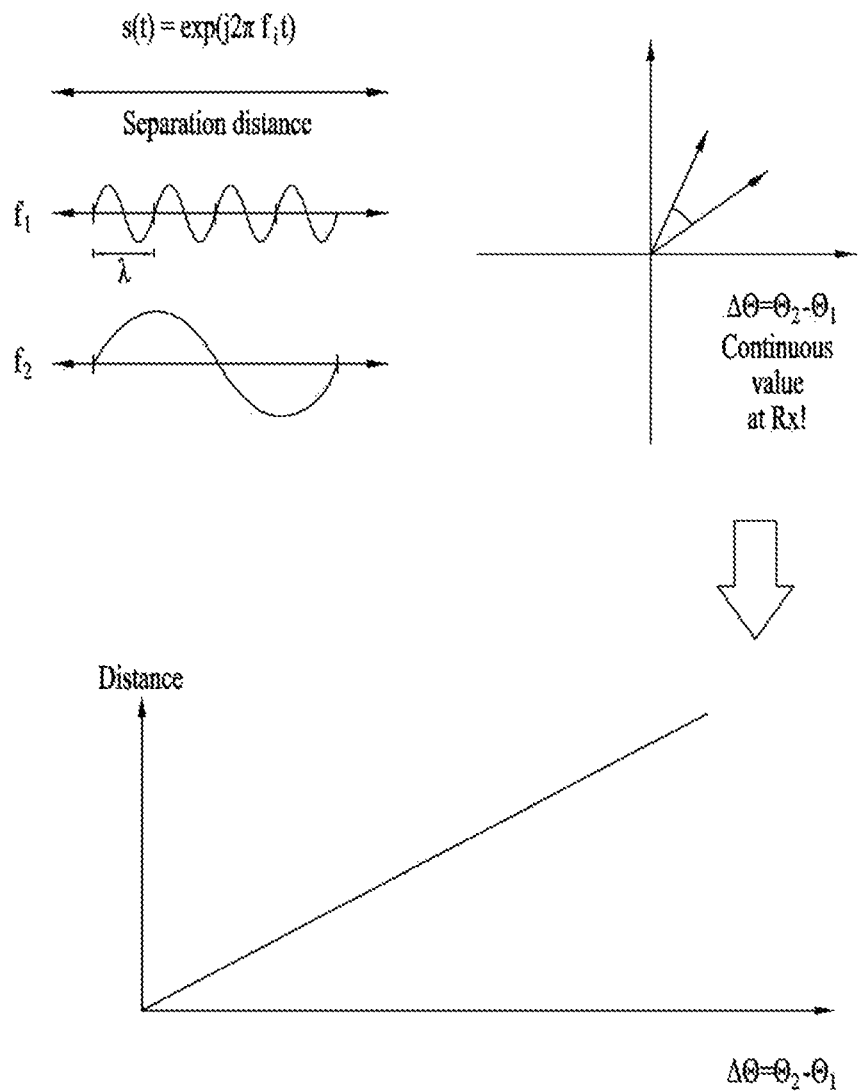
FIG. 17 is a conceptual diagram illustrating a method of measuring a distance based on phases.

FIG. 17 is a conceptual diagram illustrating a method of measuring a distance based on phases. Referring to FIG. 17, since a phase difference between two tones varies linearly depending on the phase of a signal, the sampling rate has no effect on the time domain.

First, it is assumed that a network or a transmitting UE transmits RSs on two or more frequencies. In this case, it is assumed that information on the size and phase of the RS is predetermined and known to both a transmitter and a receiver. The RS received on an m-th tone (or subcarrier) may be represented as shown in Equation 12.

$$y_m = a_m \exp(jb_m)\exp(j2\pi m \Delta f \delta) \quad \text{[Equation 12]}$$

In Equation 12, $a_m$ and $b_m$ denote the amplitude and phase response of a channel on the m-th tone, $\Delta f$ denotes a subcarrier spacing, and $\delta$ denotes a time offset between the transmitter and receiver in the time domain. The time offset may include the propagation delay of a radio signal, a sampling time difference between the transmitter and receiver, etc. Eventually, the time offset may represent a time difference between FFT windows of the transmitter and receiver. When signal reception is performed on two tones, a phase difference on each tone may be represented as shown in Equation 13 (in this case, the channel phases of the two tones may be assumed to be equal to each other).

$$\Delta\phi_{m,n} = \angle y_m - \angle y_n = 2\pi\Delta f \delta(m-n) \quad \text{[Equation 13]}$$

Assuming that there is no sampling time difference between the transmitter and receiver and the time offset depends on only the propagation delay, Equation 13 may be changed to Equation 14.

$$\Delta\phi_{m,n} = 2\pi\Delta f(m-n)\frac{R}{c} \quad \text{[Equation 14]}$$

Based thereon, a distance between the two transmitting and receiving UEs may be represented as shown in Equation 15.

$$R_{m,n} = \frac{c \cdot \Delta\phi_{m,n}}{2\pi\Delta w_{m,n}} \quad \text{[Equation 15]}$$

In Equation 15, $w_{m,n}$ denotes a frequency difference between the two tones, $\phi_{m,n}$ denotes a phase difference between the two tones, and c denotes the speed of light (about 3*10^8). Equation 15 shows distance estimation in one-way ranging (that is, a method by which a receiver measures the propagation delay of a transmitter on the assumption that the transmitter and receiver are synchronized. In two-way ranging (that is, a method by which a receiver returns a signal from a transmitter and the transmitter estimates a distance based on a phase difference), Equation 15 is multiplied by ½.

When the frequency difference between the two tones in Equation 15 is small, the phase difference may be measured to be extremely small. In this case, if there is noise in a received signal, the resolution of the distance estimation may be significantly degraded. To solve such a problem, the two tones may be located away from each other. However, when the frequency difference between the two tones increases, channels may have different phase responses, and as a result, an error may occur in the distance estimation. Assuming that each tone has a different channel phase response, Equation 13 may be modified as shown in Equation 16.

$$\Delta\phi_{m,n} = \angle y_m - \angle y_n = 2\pi\Delta f \delta(m-n) = 2\pi\Delta f(m-n)\frac{R}{c} + b_m - b_n \quad \text{[Equation 16]}$$

In this case, the distance may be estimated as shown in Equation 17.

$$R_{m,n} = \frac{c \cdot (\Delta\phi_{m,n} - (b_m - b_n))}{2\pi\Delta w_{m,n}} \quad \text{[Equation 17]}$$

That is, the distance estimation error may increase in proportional to the channel phase difference on each tone.

On the other hand, when the frequency difference between the two tones is large, the phase difference may be higher than or equal to 2 pi radians. In this case (when the phase difference is higher than or equal to 2 pi radians), there may be ambiguity in the estimated distance since the phase difference may be repeated for every 2 pi radians. Accordingly, the RS may need to be mapped such that the frequency difference between the two tones is not large.

To eliminate the ambiguity, the problem of a mismatch between channel phase responses may need to be solved using multiple tones located relatively close to each other. However, if the frequency difference between the two tones is small, the phase difference may be extremely small, and as a result, the distance estimation may be vulnerable to noise. Hereinafter, a description will be given of a method of solving such problems.

Specifically, a transmitting UE (or a network) may transmit RSs on N tones. In this case, an RS used for ranging may be configured to have the following features.

For example, N adjacent tones may be used to transmit RSs for ranging, where the value of N may be configured by the network (or an eNB). In this case, the sum of the phases of the RSs transmitted on the N tones may be 0. For example, the phase differences between the RSs may be obtained by dividing 2 pi radians into N. (e.g., exp(j*2*pi*(n−1)/N), where n=1, . . . , N−1).

Alternatively, the sum of the phase differences may be 0 with respect to a specific tone. Alternatively, the sum of the phases of the RSs transmitted on the N tones may be set to a specific value. Alternatively, the RSs on tones with a predetermined interval may be configured to have the same magnitude and/or phase. Alternatively, a Zadoff-Chu (ZC) sequence or an M-sequence may be allocated to the tone.

In some embodiments, the RSs may be arranged in a comb-type structure in the frequency domain (that is, the RSs may be arranged at the same interval in the frequency domain). For example, when the RSs are allocated to K/2 tones among K tones, the RSs may be allocated to even-number or odd numbered tones. In this case, either the ZC sequence or M-sequence may be used. When the RSs are arranged in the comb-type structure (e.g., with a repetition factor of 2) in the frequency domain, it may form a structure in which two times of repetition is made in the time domain. In such a structure, an offset may be efficiently estimated and compensated for.

In the proposed method, the RSs may be transmitted on some tones in a specific symbol. For example, the RSs may be transmitted on a maximum of two tones in one symbol and transmitted on different locations of tones in other multiple symbols. According to this method, the power spectral density (PSD) of tones in one symbol may increase, thereby improving the phase estimation resolution of a receiver.

A receiving UE may estimate a distance as follows. The receiving UE calculates a phase difference on each tone. For example, when RSs are mapped to 12 consecutive tones, the receiving UE calculates a phase difference between the first and second tones (tones 1 and 2), a phase difference between the first and third tones (tones 1 and 3), . . . , and a phase difference between the first and twelfth tones (tones 1 and 12). Assuming that all tones have the same channel phase component, the channel phase component may be eliminated, and phase components of $\Delta f, 2*\Delta f, 3*\Delta f, \ldots, 11*\Delta f$ remain. By adding up all the phase components, Equations 18 and 19 below may be obtained.

$$x = \phi_{2,1} + \Delta\phi_{3,1} + \ldots + \Delta\phi_{12,1} =$$
$$2\pi\Delta f\left(\sum_{i=1}^{11} i\right)\frac{R}{c} = 2\pi \cdot 66 \cdot \Delta f \cdot \frac{R}{c}$$
[Equation 18]

$$R = \frac{x \cdot c}{2\pi \cdot 66 \cdot \Delta f}$$
[Equation 19]

Referring to Equation 19, a measured (estimated) distance may be expressed as a distance measured with respect to a phase difference for a relatively large frequency difference $(66*\Delta f)$. That is, the above-described distance estimation method may have an effect as if virtual tones with a frequency difference 6 times greater than a maximum frequency difference of $11*\Delta f$ are arranged despite of using the maximum frequency difference. That is, according to the present disclosure, even though tones are arranged close to each other such that the channel components are as equal to each other as possible, the method may have the effect as if the virtual tones are arranged away from each other, thereby accurately estimating the distance between UEs.

In addition, the present disclosure proposes a method of estimating a distance by adding up differences between frequency tones within a predetermined interval. Assuming that N tones are used for RSs, phase differences between frequency tones with an interval of M are added up. For example, when N=12 and M=6, the following 6 phase difference combinations may be configured: (7,1), (8,2), (9,3), (10,4), (11,5), and (12,6). To this end, two tones with the same interval may be configured to have the same phase. In this embodiment, the distance between transmitting and receiving UEs may be calculated according to Equations 20 and 21 below.

$$x = \Delta\phi_{7,1} + \Delta\phi_{8,2} + \ldots + \Delta\phi_{12,6} = 2\pi \cdot 36 \cdot \Delta f \cdot \frac{R}{c}$$
[Equation 20]

$$R = \frac{x \cdot c}{2\pi \cdot 36 \cdot \Delta f}$$
[Equation 21]

Referring to Equation 20, it may be seen that the estimated distance is obtained by measuring phase differences for a frequency difference $(36*\Delta f)$, which is relatively greater than the maximum frequency difference between actual tones. That is, when the maximum frequency difference between actual tones is $6*\Delta f$, the distance estimated according to Equation 20 may have the same accuracy as that estimated from phase differences between virtual tones with a six times greater frequency difference. In other words, according to the method, the actual tones are arranged such that the channel components are as equal to each other as possible, but it has the effect as if the virtual tones are arranged away from each other, thereby estimating the distance between the UEs more accurately. In addition, this method may be more robust to channel phase variation since the tones within a predetermined interval are used. In the above proposed method, the phase difference is measured from the first and second tones (tones 1 and 2) to the first and twelfth tones (tones 1 and 12), and in this case, the channel may vary as the interval between tones increases. As a result, the phase difference between tones may be reflected in the distance estimation error, and thus, the estimation value may increase.

As described above with reference to Equations 20 and 21, a channel is likely to change as the distance between tones increases. To solve such a problem, the location of a standard tone may be set or determined as a place where the channel is not changed if possible. To this end, the present disclosure proposes a method of using a center tone as an anchor tone. For example, when 12 tones are used for transmission, a receiving UE may use as the anchor tone the sixth tone, which is located at the middle. In this case, the phase difference may have a negative value, and thus, the absolute value of the phase difference between tones may be required. This may be represented as shown in Equation 22 below.

$$x = |\Delta\phi_{1,6}| + |\Delta\phi_{2,6}| + \ldots + |\Delta\phi_{12,6}| =$$
$$2\pi\Delta f\left(\sum_{i=1}^{11} |i-5|\right)\frac{R}{c} = 2\pi \cdot 36 \cdot \Delta f \cdot \frac{R}{c}$$
[Equation 22]

According to Equation 22, the total frequency difference may decrease from $66*\Delta f$ to $35*\Delta f$, compared to when the first tone is used as the anchor tone. However, since the frequency difference between tones decreases compared to when the first tone is used as the anchor tone, the effect of the channel phase variation may decrease. Therefore, the distance may be estimated efficiently and accurately compared to when the first tone is used as the anchor tone.

Figure 18:
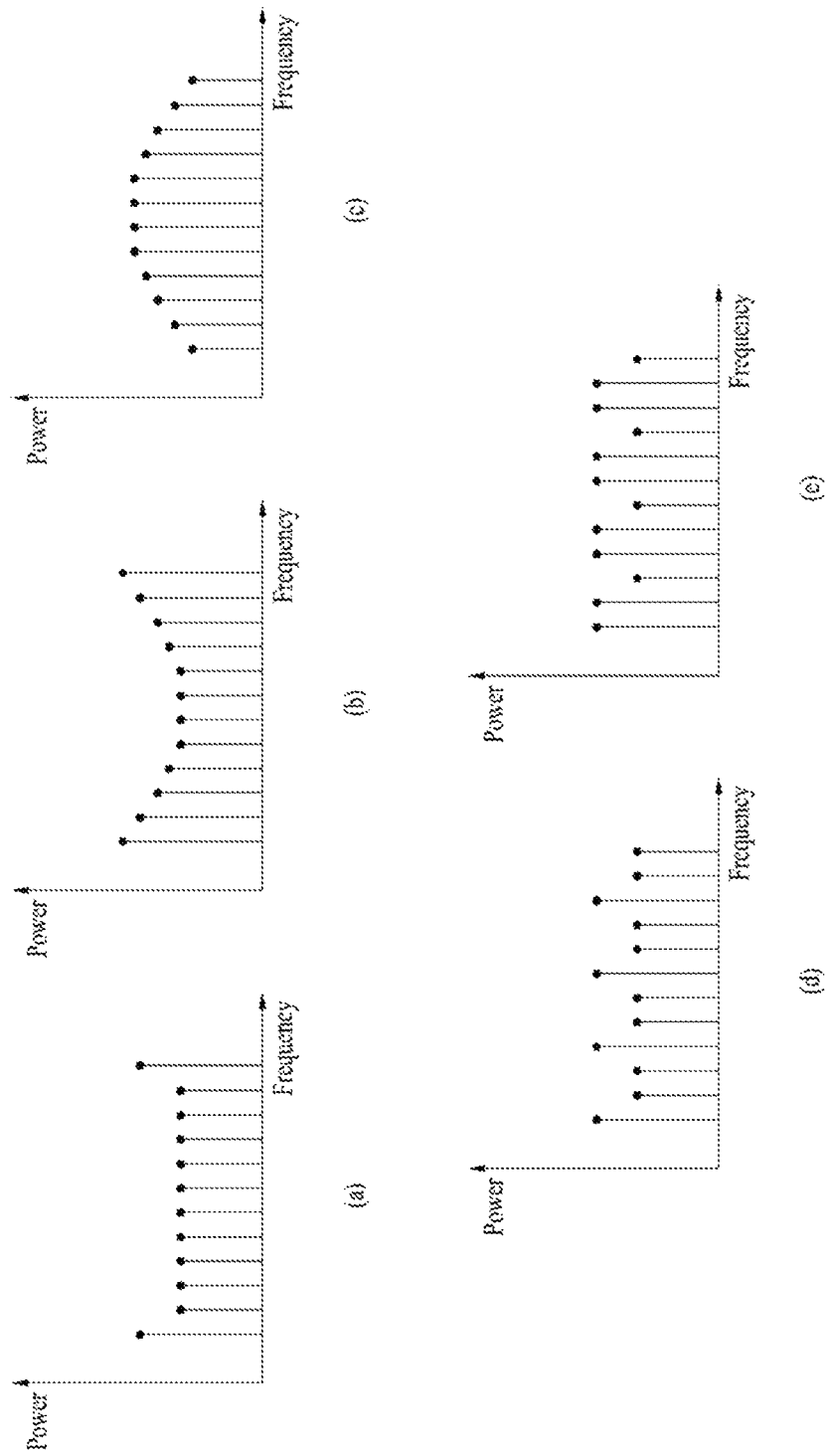
FIG. 18 is a diagram illustrating power distribution over tones to which reference signals are mapped according to an embodiment of the present disclosure.

Referring to FIG. 18, different transmit power may be assigned to each tone. The reason for this is to improve phase estimation resolution (distance estimation resolution) between specific tones. A receiver may recognize in advance that different power is assigned to each tone. Thus, when calculating a phase difference between tones, the receiver may calculate the phase difference by considering the transmit power of each tone.

Referring to FIG. 18 (a), high transmit power may be assigned to distant tones. For example, when N tones are used, X edge tones may be assigned 3 dB higher transmit power than other tones. Since the edge tones are expected to have a high phase difference, high transmit power may be assigned to the edge tones, thereby achieving high distance estimation resolution. Accordingly, the edge tones may be assigned relatively higher power than other tones as shown in FIG. 18 (a), thereby improving the phase estimation resolution between the distant tones.

Referring to FIG. 18 (b), an eNB or a transmitting UE may assign transmit power to a plurality of preconfigured tones in the shape of U or V. For example, as shown in FIG. 18 (b), when N subcarriers are used for power difference of arrival based (PDoA) based positioning, low power may be allocated to the center portion of the N subcarriers, and the allocated power may increase towards the subcarriers at both ends.

Referring to FIG. 18 (c), an eNB or a transmitting UE may assign high power to the center and decrease the assigned power towards the edges. Such a structure may be referred to as an inverted U shape or an inverted V shape. In the above power distribution, an approximate distance between UEs may be first estimated based on a phase difference between tones located close to the center, and then an accurate distance between the UEs may be estimated based on a phase difference between distant tones, thereby significantly reducing errors. Thus, the transmit power assigned to the tones located close to the center may increase for more accurate phase estimation. This method may be modified as follows: high power is allocated to some tones as shown in FIG. 16 (a). For example, high power may be allocated to X tones at the center and low power may be allocated to the remaining tones.

Referring to FIG. 18 (d), high transmit power may be allocated to every X-th tone among N tones. Thus, distance estimation may be performed with high resolution based on a phase difference between tones away from each other by a predetermined distance, and the location of a UE may be approximately estimated based on the remaining tones with low power. In FIG. 18 (d), the phase difference between tones with high power may be used for accurate distance estimation, and the phase difference between tones with low power may be used for approximate distance estimation.

Referring to FIG. 18 (e), low power may be assigned to every X-th tone unlike FIG. 18 (d). In this case, approximate distance estimation based on adjacent tones may become more accurate. A transmitting UE may signal to a neighbor UE through a physical layer signal or a higher layer signal at least one of information indicating which type of per-tone power allocation scheme (i.e., one of FIGS. (a) to (e)) the transmitting UE uses and information indicating the amount of power assigned to a specific tone when additional power is assigned to the specific tone. In addition, a network (or an eNB) may signal to the neighbor UE through a physical layer signal or a higher layer signal information indicating which type of per-tone power allocation scheme is used.

A signal for ranging may use continuous frequency of X RBs and correspond to a payload where channel coding with an RS is applied. In this case, the value X may be predetermined or signaled by a network to a UE through a physical layer signal or a higher layer signal. For the RS, some or all of the aforementioned signals may be used. In addition, the RS may be used not only for distance estimation between UEs but also for data demodulation. The payload may include information on the ID of a UE from which the distance is estimated, information on an application ID, information on an estimated phase difference, time difference, or distance, or information on the time at which a signal is transmitted. Upon receiving a ranging signal from UE A, a UE may determine the transmission time of a return signal based on a phase difference between RSs. In this case, the return signal may include information on the ID of a UE that transmits a signal for ranging, information on the ID of a UE that transmits the return signal, and time resource information for indicating when the ranging signal related to the corresponding signal is received.

The present disclosure is not limited to D2D communication. That is, the disclosure may be applied to uplink or downlink communication, and in this case, the proposed methods may be used by an eNB, a relay node, etc. Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from an eNB to a UE or from a transmitting UE to a receiving UE through a predefined signal (e.g., a physical layer signal, a higher layer signal, etc.).

Figure 19:
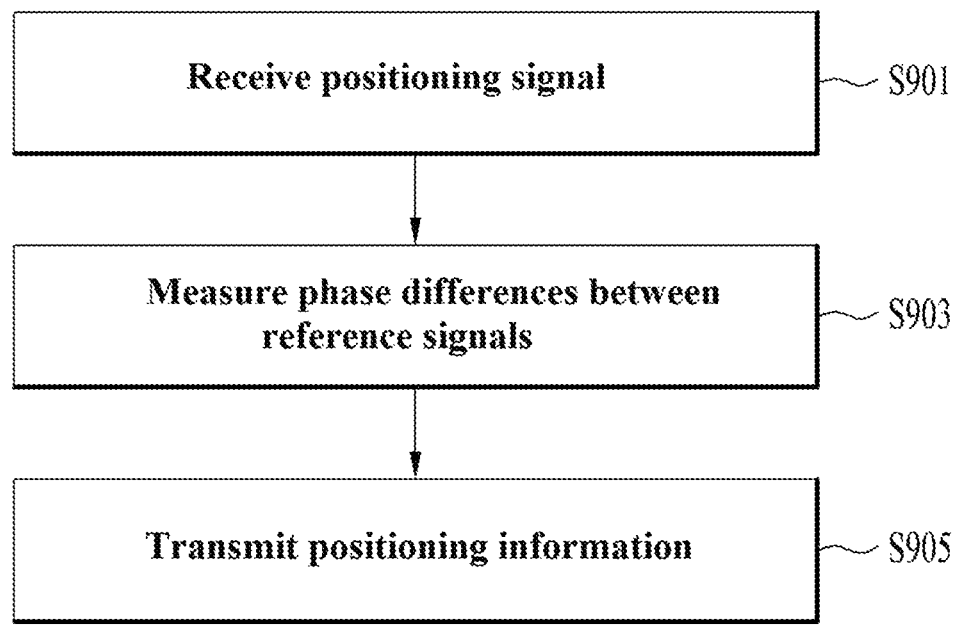
FIG. 19 is a flowchart for explaining a method by which a user equipment (UE) transmits positioning information according to an embodiment of the present disclosure.

FIG. 19 is a flowchart for explaining a method by which a UE transmits positioning information according to an embodiment of the present disclosure.

A distance from a UE to a network (or an eNB) or a transmitting UE may be estimated based on a phase difference between two tones. Specifically, a positioning signal may be phase-rotated in proportion to the frequency magnitude of a tone where an RS is mapped and the distance from the UE to the eNB. The UE may calculate and obtain the positioning information required for distance and location estimation based on the frequency interval between the two tones and the phase rotation. However, when the frequency interval between the two tones is greater than a predetermined value, it may be difficult to measure the phase difference available for the distance estimation.

For example, when the frequency interval between the two tones is large, the phase difference between RSs mapped to the two tones may be greater than or equal to 2 pi radians. In this case, the UE may not clearly determine whether or not the phase difference between the RSs mapped to the two tones is rotated 2 pi radians or more. In other words, if RSs are mapped to two tones with a large frequency interval, there may be ambiguity in distance and location estimation. To solve such a problem, the present disclosure proposes that a UE estimates a phase difference based on a positioning signal including RSs respectively mapped to N consecutive tones with a small frequency interval. Hereinafter, the method will be described in detail.

Referring to FIG. 19, the UE may receive a positioning signal for obtaining positioning information from a network or a transmitting UE. The positioning signal may include a plurality of RSs mapped to N consecutive tones. Specifically, the RSs may be mapped to the N consecutive tones one-to-one, that is, one RS may be mapped to one tone. The tones may be consecutive in the frequency domain and included in one symbol. Alternatively, the tones may be consecutive over multiple symbols in the frequency domain (S901).

The UE may measure phase differences between RSs based on the received positioning signal. The UE may measure the phase differences with respect to an anchor tone determined from among the N tones. The anchor tone may be determined by the network or the transmitting UE or autonomously determined by the UE. Specifically, the UE may measure the phase differences of RSs respectively mapped to the remaining tones except the determined anchor tone with an RS mapped to the determined anchor tone. That is, when the UE measures a phase difference between RSs respectively included in two tones, the UE may determine one of the two tones as the anchor tone and then sequentially select the other tone from among the remaining tones except the anchor tone among the N tones. For example, when N is 6 and the first tone is determined as the anchor tone, the UE may measure a phase difference between an RS mapped to the first tone and an RS mapped to the second tone, a phase difference between the RS mapped to the first tone and an RS mapped to the third tone, a phase difference between the RS mapped to the first tone and an RS mapped to the fourth tone, a phase difference between the RS mapped to the first tone and an RS mapped to the fifth tone, and a phase difference between the RS mapped to the first tone and an RS mapped to the sixth tone (S903).

The UE may estimate the phase differences between the RSs with respect to the anchor tone determined from among the N tones, and in this case, the anchor tone may vary depending on the state or selectivity of a channel carrying the positioning signal. The change in the anchor tone may be related to a change in the maximum interval between the two tones for the phase difference measurement. For example, when N is 6 and the first tone is determined as the anchor tone, the maximum interval between the two tones for the phase difference measurement is $5*\Delta f$. On the other hand, when the third tone is determined as the anchor tone, the maximum interval between the two tones for the phase difference measurement is $3*\Delta f$. Considering that the maximum interval between the two tones for the phase difference measurement varies depending on the location of the anchor tone, the anchor tone may be appropriately changed depending on the state and selectivity of the channel. Specifically, when the channel has a large phase variation, a tone adjacent to an N/2-th tone among the N tones may be determined as the anchor tone so as to become more robust to the phase variation (that is, an inner tone among the N tones may be determined as the anchor tone so that the maximum interval between the two tones decreases). On the contrary, when the channel has a small variation (the state or selectivity of the channel is low), an outer tone (i.e., the first tone or an N-th tone) among the N tones may be determined as the anchor tone (that is, the anchor tone may be changed such that the maximum interval between the two tones for the phase difference measurement increase in order to improve the distance estimation resolution). As described above, the UE may change and determine the anchor tone depending on the state or selectivity of the channel so as to become more robust to the channel variation.

When the state or selectivity of the channel is less than a predetermined threshold, any one of the first and N-th tones among the N tones may be determined as the anchor tone. That is, when the channel has a small phase variation, the UE may determine an outer tone as the anchor tone. In this case, since the phase variation of the channel does not cause no significant errors, the network or the transmitting UE may perform accurate distance estimation based on the positioning information including information on the phase difference between RSs mapped to two tones with a large frequency interval.

On the other hand, when the selectivity of the channel is greater than or equal to the predetermined threshold, neither the first tone nor the N-th tone among the N tones may be determined as the anchor tone. That is, since the phase variation of the channel may cause significant errors when the selectivity of the channel is high, an inner tone may be determined as the anchor tone so that the two tones for the phase difference measurement has a small frequency interval, instead of determining the outer tone among the N tones as the anchor tone. For example, a center tone or a tone adjacent thereto among the N tones may be determined as the anchor tone. In this case, since the frequency interval between the two tones for the phase difference measurement decreases, the occurrence of errors due to the phase variation of the channel may be minimized based on the phase difference during the distance estimation. For example, although the network or the transmitting UE estimates the distance from the UE based on the positioning information including information on the phase difference between RSs mapped to two tones with a large frequency interval, the UE may ignore the errors caused by the phase variation of the channel. The UE may autonomously determine the anchor tone by considering the state of the channel. Alternatively, the network or the transmitting UE may determine the anchor tone by considering the state of the channel and then inform the UE of the anchor tone.

The UE may measure the phase differences between the RS mapped to the anchor tone and a plurality of RSs and then calculate the sum of the measured phase differences. In other words, the UE may measure the phase differences between the RS mapped to the anchor tone and the RSs mapped to the remaining tones and add up all the measured phase differences. When calculating the sum of the measured phase differences, the UE may use the absolute values of the measured phase differences depending on the location of the anchor tone.

For example, it is assumed that when N is 6 and the first tone is determined as the anchor tone, the UE measures the phase difference between the RS mapped to the first tone and the RS mapped to the second tone, the phase difference between the RS mapped to the first tone and the RS mapped to the third tone, the phase difference between the RS mapped to the first tone and the RS mapped to the fourth tone, the phase difference between the RS mapped to the first tone and the RS mapped to the fifth tone, and the phase difference between the RS mapped to the first tone and the RS mapped to the sixth tone as a, b, c, d, and e, respectively. The UE may calculate the value of a +b+c+d+e as the sum of the phase differences and then transmit to the network or the transmitting UE the positioning information including information on the sum of the phase differences. In this case, the sum may include a value corresponding a phase difference between two tones with an interval greater than the maximum frequency interval between the 6 tones, $5*\Delta f$. That is, the UE may calculate a value corresponding to a phase difference between virtual two tones with an interval greater than the maximum frequency interval between the 6 tones, $5*\Delta f$ based on the sum. The distance estimation based on the sum of the measured phase differences may have equivalent effects to those of the distance estimation based on a phase difference measured for RSs mapped to two tones with an interval greater than the maximum frequency interval between two tones among the N tones.

The UE may transmit the positioning information including information on the phase differences of the RSs included in the remaining tones with the RS in the anchor tone or the positioning information including the information on the sum of the phase differences between the RSs. Alternatively, the UE may transmit the positioning information including all the information (S905).

The UE may select M consecutive tones from among the N consecutive tones and then determine one of the selected M tones as the anchor tone by considering the channel selectivity. In this case, the UE may additionally provide the network or the transmitting UE information on the number of selected tones M and the location of the anchor tone, and the information may be included in the positioning information.

In some embodiments, relatively higher transmit power may be allocated to specific tones among the N tones than other tones, and the specific tones may be transmitted in the positioning signal. For example, when transmitting the positioning signal, an eNB may allocate higher transmit power to the specific tones than the other tones in order to improve the resolution of phase difference measurement between RSs mapped to the specific tones.

Specifically, the network or the transmitting UE may approximately estimate the distance from the UE based on a phase difference between tones located close to the center and adjust the approximately estimated distance based on a phase difference between distant tones for more accurate distance estimation. For this reason, the network or the transmitting UE may allocate higher transmit power to the specific tones among the N tones than the other tones.

For example, the network or the transmitting UE may allocate high transmit power to the first and last tones among the N tones. When high transmit power is allocated to such edge tones among the N tones, the phase estimation resolution between the distant tones may be improved.

Alternatively, the network or the transmitting UE may allocate the transmit power to the N tones in the shape of U or V. That is, the network or the transmitting UE may allocate low power to the center portion of the N subcarriers (or tones) and increase the allocated power towards the subcarriers (tones) at both ends.

Alternatively, the network or the transmitting UE may allocate high transmit power to every X-th tone among the N tones. In this case, a phase difference between tones with high power may be used for accurate distance estimation, and a phase difference between tones with low power may be used for approximate distance estimation.

Alternatively, the network or the transmitting UE may allocate low transmit power to every X-th tone among the N tones. In this case, approximate distance estimation based on adjacent tones may become more accurate.

Alternatively, the network or the transmitting UE may allocate higher power to the anchor tone, which is used as a standard in the phase difference measurement, than other tones. In this case, the RS mapped to the anchor tone may be more robust to other RSs mapped to the remaining tones, thereby estimating the distance more accurately.

Further, the network or the transmitting UE may signal to the UE or a neighbor UE through a physical layer signal or a higher layer signal at least one of information about which tone additional transmit power or low transmit power is allocated to and information about how much power is allocated to a specific tone.

Figure 20:
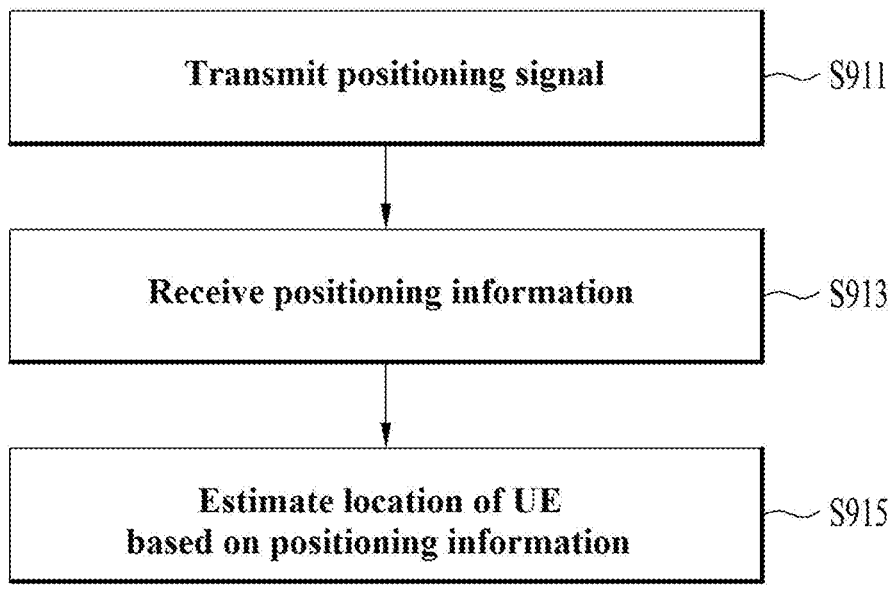
FIG. 20 is a flowchart for explaining a method by which an evolved node B (eNB) estimates a distance from a UE by receiving positioning information.

FIG. 20 is a flowchart for explaining a method by which an eNB estimates a distance from a UE by receiving positioning information.

Referring to FIG. 20, the eNB may transmit to the UE a positioning signal including RSs, which are required for the eNB to obtain positioning information. The eNB may map the RSs to N consecutive tones one-to-one and transmit the positioning signal including the RSs (S911).

The eNB may provide the UE information on how many tones among the N tones included in the positioning signal are used to measure phase differences between the RSs and information which tone among the tones for the phase difference measurement is used as an anchor tone. To this end, the eNB may obtain information on the selectivity or state of a channel carrying the positioning signal in advance and then determine the anchor tone based on the information. As described above with reference to FIG. 17, the eNB may determine any one of the first and N/2-th tones among the N tones as the anchor tone based on the selectivity of the channel. Alternatively, the eNB may determine any one of the N/2-th and N-th tones among the N tones as the anchor tone based on the selectivity of the channel.

As the selectivity of the channel increases, the eNB may change the anchor tone such that the anchor tone is closer to the N/2-th tone among the N tones. On the other hand, as the selectivity of the channel decreases, the eNB may change the anchor tone such that the anchor tone is further away from the N/2-th tone. In other words, as the selectivity of the channel decreases, the eNB may change the anchor tone such that the anchor tone is closer to either the first or N-th tone.

When the selectivity of the channel or the phase variation of the channel is greater than or equal to a predetermined threshold, a tone located at the center of the N tones may be determined as the anchor tone. On the contrary, when the selectivity of the channel or the phase variation of the channel is less than the predetermined threshold, either the first tone or the N-th tone among the N tones may be determined as the anchor tone.

In some embodiments, relatively higher transmit power may be allocated to specific tones among the N tones than other tones, and the specific tones may be transmitted in the positioning signal. For example, when transmitting the positioning signal, the eNB may allocate higher transmit power to the specific tones than the other tones in order to improve the resolution of phase difference measurement between RSs mapped to the specific tones.

Specifically, a network or a transmitting UE may approximately estimate the distance from the UE based on a phase difference between tones located close to the center and adjust the approximately estimated distance based on a phase difference between distant tones for more accurate distance estimation. For this reason, the network or the transmitting UE may allocate higher transmit power to the specific tones among the N tones than the other tones.

For example, the network or the transmitting UE may allocate high transmit power to the first and last tones among the N tones. When high transmit power is allocated to such edge tones among the N tones, the phase estimation resolution between the distant tones may be improved.

Alternatively, the network or the transmitting UE may allocate the transmit power to the N tones in the shape of U or V. That is, the network or the transmitting UE may allocate low power to the center portion of the N subcarriers (or tones) and increase the allocated power towards the subcarriers (tones) at both ends.

Alternatively, the network or the transmitting UE may allocate high transmit power to every X-th tone among the N tones. In this case, a phase difference between tones with high power may be used for accurate distance estimation, and a phase difference between tones with low power may be used for approximate distance estimation.

Alternatively, the network or the transmitting UE may allocate low transmit power to every X-th tone among the N tones. In this case, approximate distance estimation based on adjacent tones may become more accurate.

Alternatively, the network or the transmitting UE may allocate higher power to the anchor tone used as a reference for the phase difference measurement than other tones. In this case, the RS mapped to the anchor tone may be more robust to other RSs mapped to the remaining tones, thereby estimating the distance more accurately.

Further, the network or the transmitting UE may signal to the UE or a neighbor UE through a physical layer signal or a higher layer signal at least one of information about which tone additional transmit power or low transmit power is allocated to and information about how much power is allocated to a specific tone.

The eNB may receive from the UE the positioning information including information on the phase differences measured based on the positioning signal (S913). Then, the eNB may estimate the distance from the UE based on the received positioning information.

The positioning information may include information on the phase differences between the RSs measured by the UE with respect to the RS mapped to the anchor tone. That is, the positioning information may include information on the phase differences between the RS on the anchor tone and RSs on the first to the N-th tones (except the anchor tone). For example, when N is 6 and the first tone is determined as the anchor tone, the positioning information may include information on a phase difference between an RS mapped to the first tone and an RS mapped to the second tone, a phase difference between the RS mapped to the first tone and an RS mapped to the third tone, a phase difference between the RS mapped to the first tone and an RS mapped to the fourth tone, a phase difference between the RS mapped to the first tone and an RS mapped to the fifth tone, and a phase difference between the RS mapped to the first tone and an RS mapped to the sixth tone.

As described above with reference to FIG. 19, the positioning information may include information on the sum of the phase differences between the RS on the anchor tone and the RSs on the first to the N-th tones (except the anchor tone).

Alternatively, the positioning information may include both the information on the phase differences between the RS on the anchor tone and the RSs on the first to the N-th tones (except the anchor tone) and the information on the sum of the phase differences.

Alternatively, the eNB may be further receive, from the UE, information on the number of tones used for the location difference estimation among the N tones, M and the location of the anchor tone determined by the UE.

The eNB may estimate the distance from the UE based on the received positioning information. The eNB may calculate a value corresponding to an RSTD based on the phase differences included in the positioning information. Further, upon receiving positioning information for another eNB, the eNB may estimate the location of the UE further based on the calculated value corresponding to the RSTD (S915).

Figure 21:
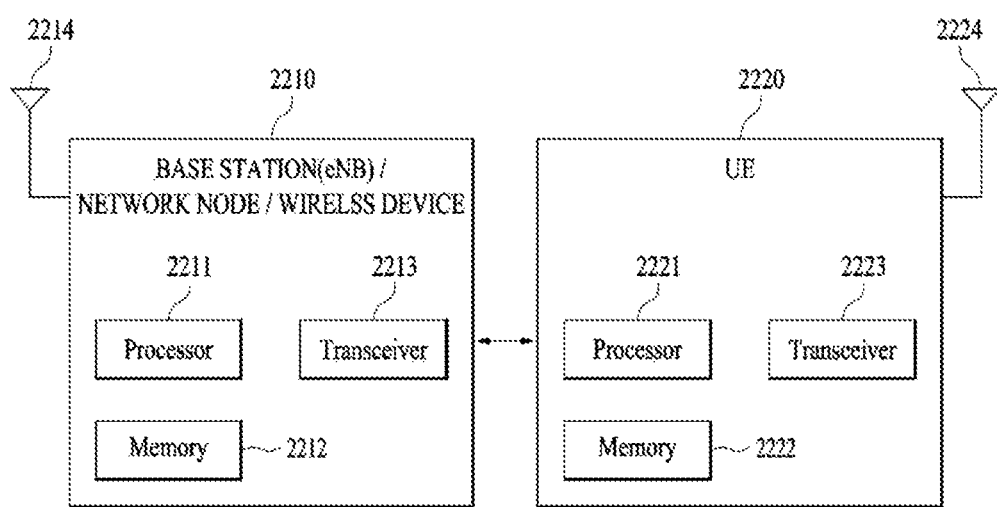
FIG. 21 is a block diagram of wireless communication devices according to an embodiment of the present disclosure.

FIG. 21 is a block diagram of wireless communication devices according to an embodiment of the present disclosure.

Referring to FIG. 21, a wireless communication system may include a BS (eNB) 2210 and a UE 2220. The UE 2220 may be located in the coverage of the BS 2210. In some embodiments, the wireless communication system may include a plurality of UEs. Although FIG. 21 shows the BS 2210 and the UE 2220, the present disclosure is not limited thereto. For example, the BS 2210 may be replaced with a network node, a UE, a radio device, etc. Alternatively, each of the BS and UE may be substitute with a radio communication device or a radio device.

The BS 2210 may include at least one processor 2211, at least one memory 2212, and at least one transceiver 2213. The processor 2211 may be configured to process the details of the embodiments to implement the functions, procedures, or methods described above in the embodiments.

Specifically, the processor 2211 may respectively map RSs to N consecutive tones and control the at least one transceiver 2213 to transmit a positioning signal including the N consecutive tones to the UE. The processor 2211 may control the at least one transceiver 2213 to receive positioning information including information on phase differences between an RS mapped to an anchor tone corresponding to a standard tone among the N consecutive tones and RSs respectively mapped to the remaining tones, which are measured by the UE. In this case, the positioning information may include information on the sum of the measured phase differences between the RSs. When mapping the RSs to the N consecutive tones, respectively, the processor 2211 may map RSs with the same phase information to the N consecutive tones. The processor 2211 may map RSs of which the sum of the phase information is predetermined to the N consecutive tones. The processor 2211 may transmit the positioning signal by allocating the highest transmit power to the anchor tone among the N consecutive tones. The processor may transmit the positioning information by allocating the highest transmit power to the first and N-th tones among the N consecutive tones.

In addition, the processor 2211 may implement at least one protocols. For example, the processor 2211 may implement one or more radio interface protocol layers (e.g., functions layers). The memory 2212 may be connected to the processor 2211 and store various types of information and/or instructions. The transceiver 2213 may be electrically connected to the processor 2211 and transmit and receive radio signals under the control of the processor 2211.

The UE 2220 may include at least one processor 2221, at least one memory 2222, and at least one transceiver 2223. The processor 2221 may perform the operations required for the embodiments to implement the functions, procedures or methods described above in the embodiments.

Specifically, the processor 2221 may control the transceiver 2223 to receive, from a network or a transmitting UE, a positioning signal including N consecutive tones to which RSs are mapped (the received information may be stored in the memory 2222). The processor 2221 may receive from the memory 2222 information on the positioning signal including the N consecutive tones to which the RSs are mapped and measure phase differences between an RS mapped to an anchor tone corresponding to a standard tone among the N consecutive tones and RSs mapped to the remaining tones. The processor 2221 may generate positioning information including information on the measured phase differences. The processor 2221 may calculate the sum of the measured phase differences between the RSs and include information on the calculated sum of the phase differences between RSs in the positioning information.

Alternatively, the processor 2221 may determine any one of the N consecutive tones as the anchor tone based on the sensitivity of a channel carrying the positioning signal. In addition, the processor 2221 may determine either the first tone or the N-th tones among the N consecutive tones as the anchor tone. Further, the processor may determine the N/2-th tone among the N consecutive tones as the anchor tone.

Alternatively, the processor 2221 may control the transceiver 2223 to receive information on the anchor tone determined by the BS or the transmitting UE based on the sensitivity of the channel carrying the positioning signal.

Alternatively, the processor 2221 may calculate information on the sum of the phase differences between the RSs corresponding to information on a phase difference between RSs mapped to two tones with a virtual frequency interval. The virtual frequency interval may be greater than the maximum frequency difference between the N tones.

Alternatively, the processor 2221 may generate the positioning information including information on the sum of the absolute values of the measured phase differences between the RSs.

Alternatively, the processor 2221 may select M consecutive tones from among the N consecutive tones included in the positioning signal, where M is an integer smaller than N. In addition, the processor 2221 may determine the anchor tone from among the M consecutive tones based on the sensitivity of a channel carrying the positioning information. In this case, the positioning information may further include information on the value of M and the determined anchor tone.

In addition, the processor 2221 may implement one or more protocols. For example, the processor 2221 may implement one or more radio interface protocol layers (e.g., functional layers). The memory 2222 may be connected to the processor 2221 and configured to store various types of information and/or instructions. The transceiver 2223 may be electrically connected to the processor 2221 and configured to transmit and receive radio signals under the control of the processor 2221.

The memory 2212 and/or 2222 may be located inside or outside the processor 2211 and/or 2221 and connected to the processor 2211 and/or 2221 in various ways such as wireless or wired connections.

Each of the BS 2210 and/or the UE 2220 may have a single antenna or multiple antennas. For example, an antenna 2214 and/or 2224 may be configured to transmit and receive radio signals.

Figure 22:
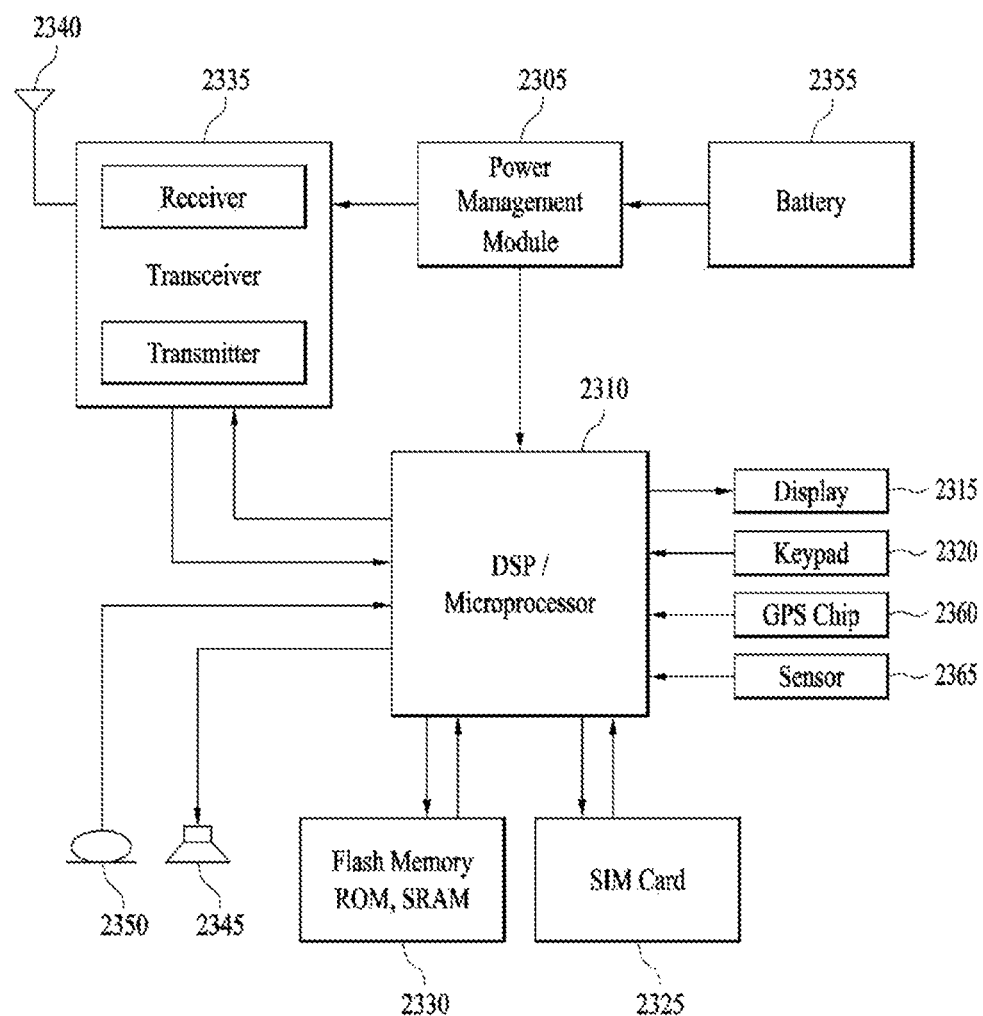
FIG. 22 is a diagram schematically illustrating a wireless communication device according to an embodiment of the present disclosure.

FIG. 22 is a diagram schematically illustrating a wireless communication device according to an embodiment of the present disclosure.

Particularly, FIG. 22 illustrates, as an example, the UE 2220 shown in FIG. 21 in detail. However, the wireless communication device of FIG. 22 is not limited to the UE 2220, and the wireless communication device may be any mobile computing device configured to be suitable for implementing at least one of the above-described embodiments. For example, such a mobile computing device may include a vehicle communication system and/or device, a wearable device, a laptop, a smartphone, etc.

Referring to FIG. 22, the UE 2220 may include at least one of the following components: a processor 2310 including a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345, and a microphone 2350. The UE 2220 may include a single antenna or multiple antennas.

The processor 2310 may be configured to process the details of the embodiments to implement the functions, procedures, or methods described above in the embodiments. In some embodiments, the processor 2310 may implement one or more protocols such as radio interface protocol layers (e.g., functional layers).

The memory 2330 may be connected to the processor 2310 and configured to store information related to operations of the processor 2310. The memory 2330 may be located inside or outside the processor 2310 and connected to the processor 2310 in various ways such as wireless or wired connections.

A user may enter various types of information (e.g., instruction information such as a phone number) in various ways, for example, by pushing the buttons on the keypad 2320 or by voice recognition through the microphone 2350. The processor 2310 may receive and process the information from the user and then perform an appropriate function such as dialing the phone number. In some embodiments, data (e.g., operational data) may be retrieved from the SIM card 2325 or the memory 2330 to perform specific function(s). In some embodiments, the processor 2310 may receive and process GPS information from the GPS chip 2360 and then perform functions related to the position or location of the UE (e.g., vehicle navigation, map services, etc.). In some embodiments, the processor 2310 may display various types of information and data on the display 2315 for the user's reference and convenience.

The transceiver 2335 may be connected to the processor 2310 and configured to transmit and/or receive a radio signal such as a radio frequency (RF) signal. The processor 2310 may control the transceiver 2335 to initiate communication and transmit radio signals including various types of information or data, for example, voice communication data. The transceiver 2335 includes a receiver configured to receive a radio signal and a transmitter configured to transmit a radio signal. The antenna 2340 is a device for performing radio signal transmission and reception. In some embodiments, upon receiving radio signals, the transceiver 2335 may forward and convert the signals to baseband frequency for processing by the processor 2310. The processed signals may be converted into audible or readable information based on various techniques, and the audible or readable information may be output through the speaker 2345 or the display 2315.

In some embodiments, the sensor 2365 may be connected to the processor 2310. The sensor 2365 may include one or more sensing devices configured to detect various types of information such as a speed, acceleration, light, vibration, proximity, location, image, etc. The processor 2310 may receive and process sensor information obtained from the sensor 2365 and perform various types of functions such as collision avoidance, autonomous driving, etc.

As shown in FIG. 22, the UE may further include various components (e.g., a camera, a universal serial bus (USB) port, etc.). For example, a camera may be further connected to the processor 2310 and used for various services such as autonomous driving, vehicle safety services, etc. That is, FIG. 22 shows one example of the UE, and thus, the scope of the present disclosure is not limited to the configuration illustrated in FIG. 22. For example, some of the following components: the keypad 2320, the GPS chip 2360, the sensor 2365, the speaker 2345, and the microphone 2350 may not be included or implemented in the UE.

Figure 23:
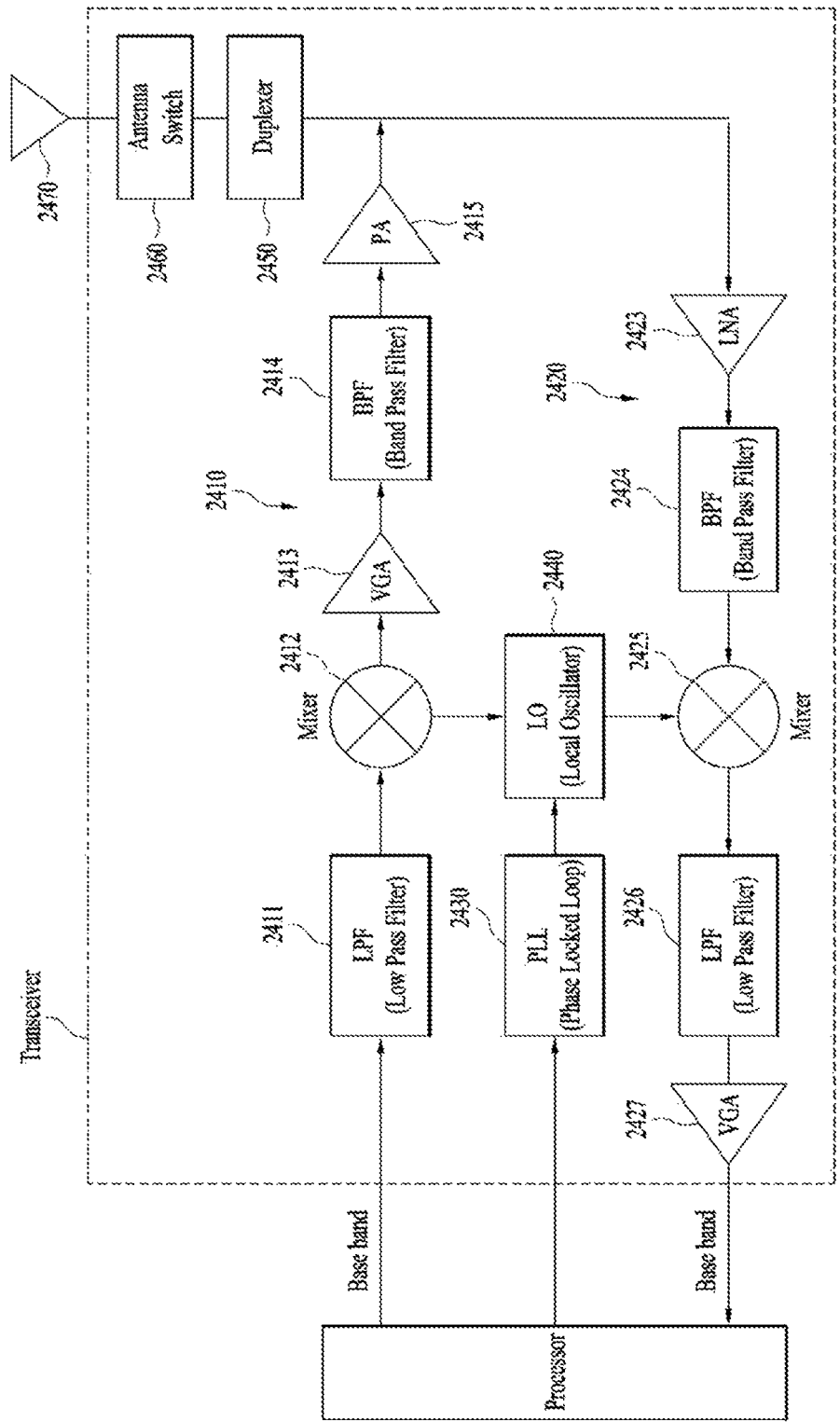
FIG. 23 is a block diagram schematically illustrating a transceiver of a wireless communication device.

FIG. 23 is a block diagram schematically illustrating a transceiver of a wireless communication device according to an embodiment of the present disclosure.

Specifically, FIG. 23 shows an example of a transceiver capable of operating in an FDD system.

In the transmit path, at least one processor including the processors described in FIGS. 21 and 22 may be configured to process data to be transmitted and provide a signal such as an analog output signal to a transmitter 2410.

At the transmitter 2410, the analog output signal may be filtered by a low pass filter (LPF) 2411 (to remove artifacts caused by conventional analog-to-digital conversion (ADC)), up-converted from baseband to RF by an up-converter (e.g., mixer) 2412, and amplified a variable gain amplifier (VGA) 2413. The amplified signal may be filtered by a filter 2414, further amplified by a power amplifier (PA) 2415, routed through a duplexer 2450 and/or an antenna switch 2460, and transmitted on an antenna 2470.

In the receive path, the antenna 2470 may receive a signal from a wireless environment. The receive signal may be routed through the antenna switch 2460 and the duplexer 2450 and then provided to a receiver 2420.

At the receiver 2420, the received signal may be amplified by an amplifier such as a low noise amplifier (LNA) 2423, filtered by a band pass filter 2424, and down-converted from RF to baseband by a downconverter (e.g., mixer) 2425.

The down-converted signal may be filtered by an LPF 2426 and amplified by an amplifier such as a VGA 2427 to obtain an analog input signal. Then, the analog input signal may be provided to the processors in FIGS. 21 and 22.

Further, a local oscillator (LO) generator 2440 may generate and provide transmission and reception LO signals to the up-converter 2412 and the down-converter 2425, respectively.

The present disclosure is not limited to the configuration shown in FIG. 23, and various components and circuits may be arranged differently from the example shown in FIG. 23 to achieve the functions and effects according to the present disclosure.

Figure 24:
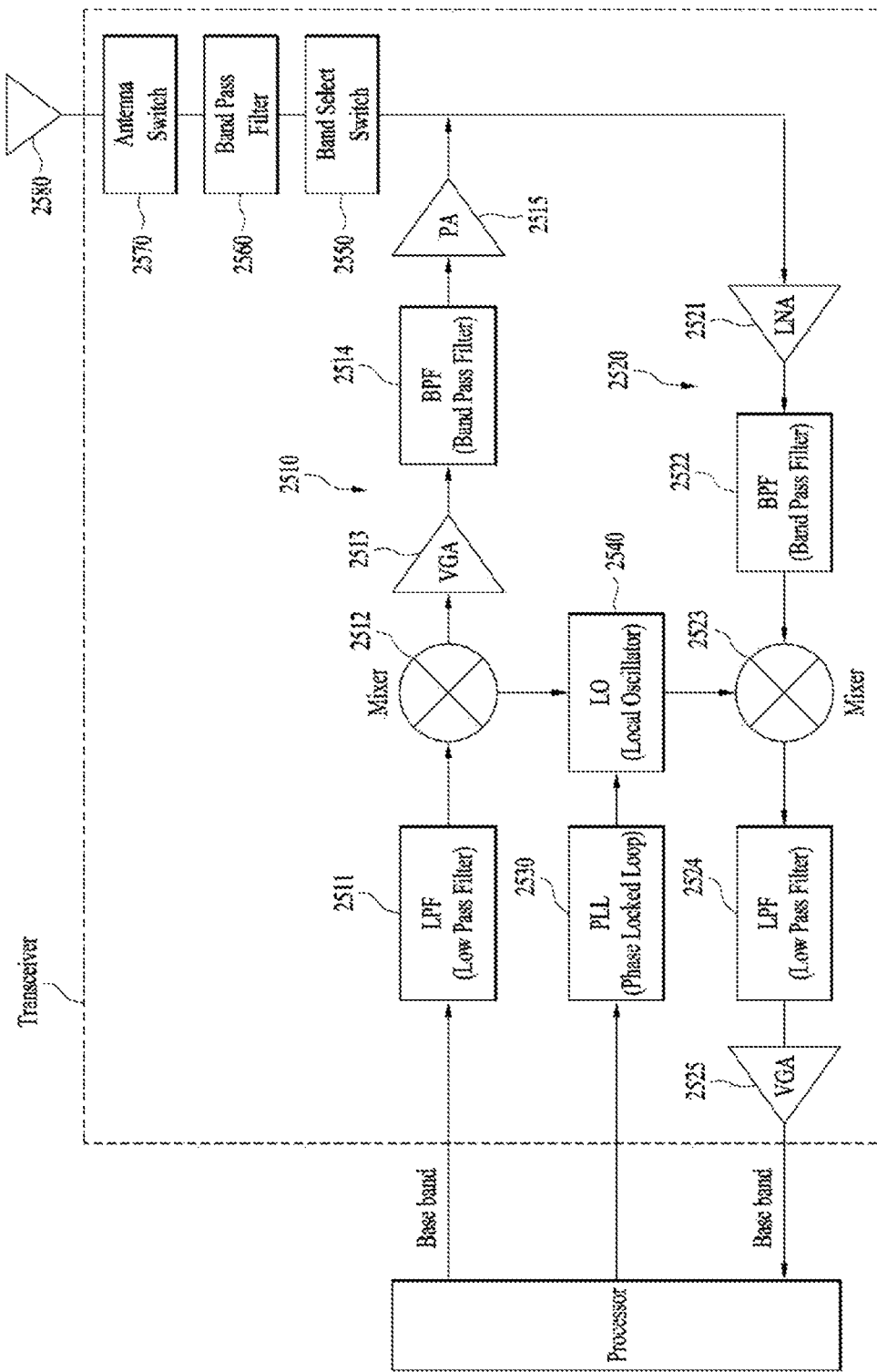
FIG. 24 is a block diagram schematically illustrating another example of a transceiver of a wireless communication device.

FIG. 24 illustrates another example of a transceiver of a wireless communication device according to an embodiment of the present disclosure.

Specifically, FIG. 23 shows an example of a transceiver capable of operating in a TDD system.

In some embodiments, a transmitter 2510 and a receiver 2520 included in the transceiver of the TDD system may have one or more features similar to those of the transmitter and the receiver included in the transceiver of the FDD system. Hereinafter, the structure of the transceiver of the TDD system will be described.

In the transmit path, a signal amplified by a power amplifier (PA) 2515 in the transmitter is routed through a band select switch 2550, a BPF 2560, and an antenna switch 2570 and transmitted on an antenna 2580.

In the receive path, the antenna 2580 may receive a signal from a wireless environment. The receive signal may be routed through the antenna switch(es) 2570, BPF 2560, and band select switch 2550 and provided to the receiver 2520.

Figure 25:
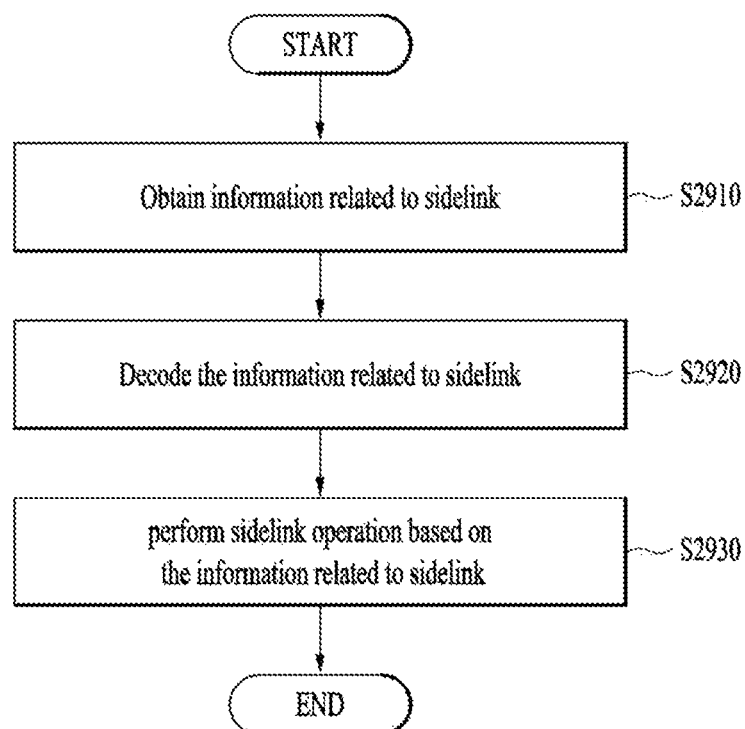
FIG. 25 is a flowchart for explaining sidelink operations of a wireless device.

FIG. 25 is a flowchart for explaining sidelink operations of a wireless device.

Referring to FIG. 25, the wireless device may obtain information related to sidelink (S2910). The information related to the sidelink may include at least one resource configuration. The information related to the sidelink may be obtained from another wireless device or a network node.

After obtaining the information, the wireless device may decode the information related to the sidelink (S2920).

After decoding the information related to the sidelink, the wireless device may perform one or more sidelink operations based on the information related to the sidelink (S2930). Herein, the sidelink operation(s) performed by the wireless device may correspond to the one or more operations described in the flowchart.

The sidelink operations of the wireless device illustrated in FIG. 25 is merely exemplary, and the wireless device may perform sidelink operations based on various techniques. The sidelink may correspond to a UE-to-UE interface for sidelink communication and/or sidelink discovery. The sidelink may correspond to a PC5 interface as well. In a broad sense, sidelink operation may mean information transmission/reception between UEs.

Figure 26:
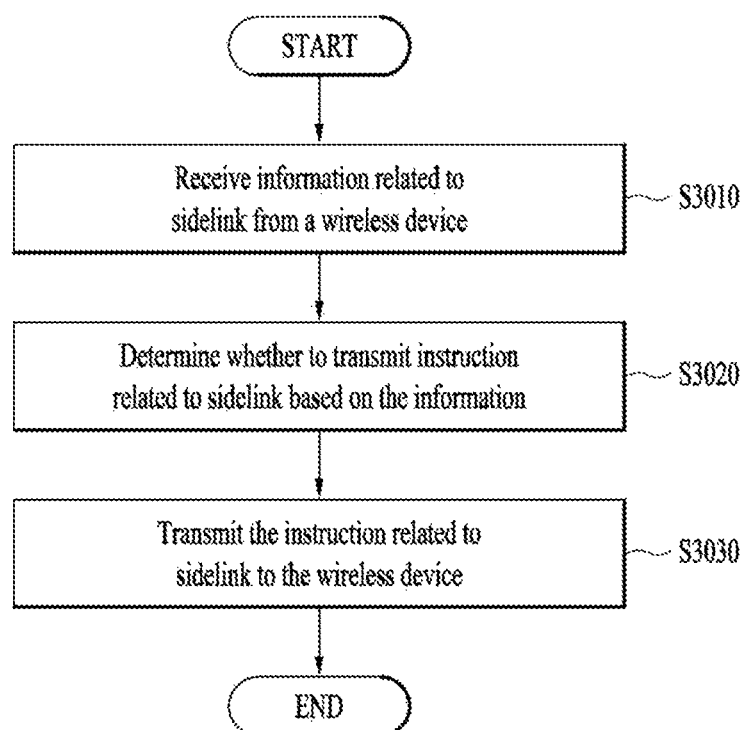
FIG. 26 is a flowchart for explaining sidelink operations of a network node.

FIG. 26 is a flowchart for explaining sidelink operations of a network node.

The sidelink operations of the network node illustrated in FIG. 26 is merely exemplary, and the network node may perform sidelink operations based on various techniques.

The network node may receive information related to sidelink from a wireless device (S3010). For example, the information related to the sidelink may be 'SidelinkUEInformation' which is used to indicate sidelink information to a network node.

After receiving the information, the network node may determine whether to transmit one or more instructions related to the sidelink based on the received information (S3020).

When determining to transmit the instruction(s), the network node may transmit the sidelink-related instruction(s) to the wireless device (S3030). In some embodiments, after receiving the instruction(s) transmitted from the network node, the wireless device may perform one or more sidelink operations based on the received instruction(s).

Figure 27:
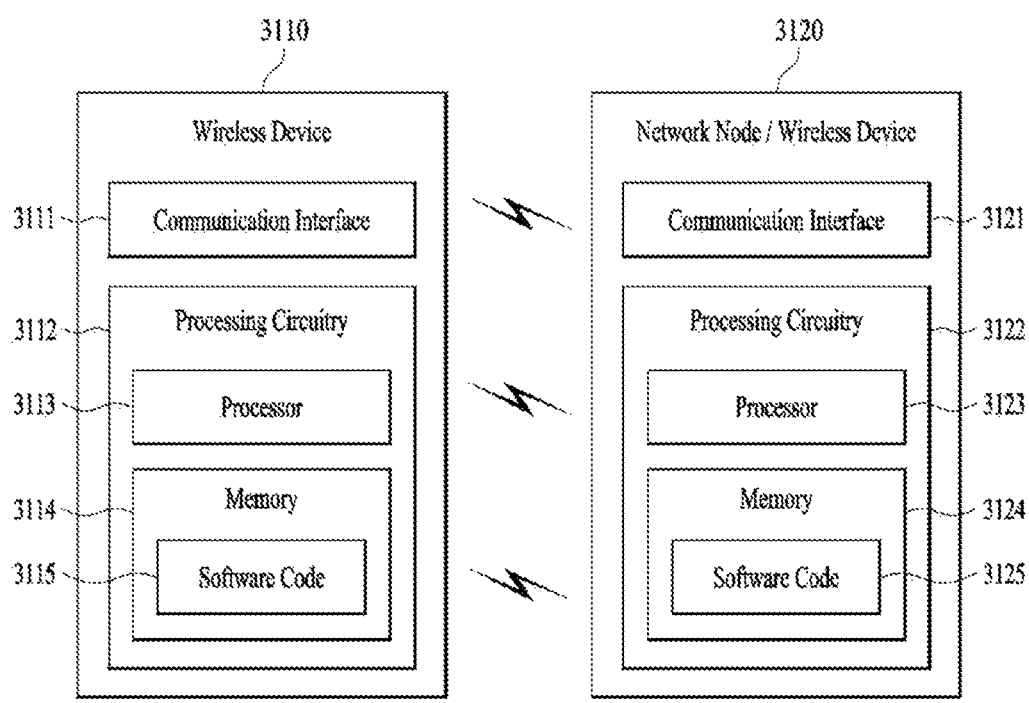
FIG. 27 is a block diagram schematically illustrating the configurations of a wireless device and a network node.

FIG. 27 is a block diagram schematically illustrating the configurations of a wireless device and a network node. A network node 3120 may be replaced with the wireless device or UE shown in FIG. 21.

For example, a wireless device 3110 may include a communication interface 3111 for communicating with one or more other wireless devices, network nodes, and/or other entities in the network. The communication interface 3111 may include one or more transmitters, one or more receivers, and/or one or more communications interfaces. The wireless device 3110 may include a processing circuitry 3112. The processing circuitry 3112 may include at least one processor such as a processor 3113 and at least one memory device such as a memory 3114.

The processing circuitry 3112 may be configured to control at least one of the above-described methods and/or processes and enable the wireless device 3110 to perform the methods and/or processes. The processor 3113 may correspond to one or more processors for performing the wireless device functions described herein. The wireless device 3110 may include a memory 3114 configured to store data, programmable software code, and/or other information described herein.

In some embodiments, the memory 3114 may be configured to store software code 3115 including instructions that allow at least one processor to perform some or all of the processes described above with reference to FIG. 25 or the methods described above in the embodiments.

For example, at least one process for transmitting and receiving information may be performed by the processor 3113 controlling the transceiver 2223 in FIG. 21 to transmit and receive the information.

The network node 3120 may include a communication interface 3121 for communicating with one or more other network nodes, wireless devices, and/or other entities in the network. The communication interface 3121 may include one or more transmitters, one or more receivers, and/or one or more communications interfaces. The network node 3120 may include a processing circuitry 3122. The processing circuitry 3122 may include a processor 3123 and a memory 3124.

For example, at least one process for transmitting and receiving information may be performed by the processor 3123 controlling the transceiver 2213 in FIG. 21 to transmit and receive the information.

The above-described embodiments of the present disclosure may be implemented through various means, for example, hardware, firmware, software, or a combination thereof.

In a hardware configuration, the methods according to the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. for performing the above-described functions or operations. Software code may be stored in a memory unit and executed by a processor. The memory unit may be located inside or outside the processor and exchange data with the processor via various known means.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give the broadest scope consistent with the new principles and features disclosed herein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method performed by a user equipment (UE) in a wireless communication system supporting sidelink, the method comprising:
receiving, from a network or a transmitting UE, a positioning signal including N consecutive tones to which reference signals are mapped (where N is an integer);
measuring phase differences between a reference signal mapped to an anchor tone among the N consecutive tones and reference signals respectively mapped to remaining tones, wherein the anchor tone corresponds to a standard tone; and
transmitting positioning information including information regarding the measured phase differences to the network or the transmitting UE,
wherein the positioning information includes information regarding a sum of the measured phase differences between the reference signals.

2. The method of claim 1, wherein any one of the N consecutive tones is determined as the anchor tone based on selectivity of a channel carrying the positioning signal.

3. The method of claim 1, wherein either a first tone or an N-th tone among the N consecutive tones is determined as the anchor tone.

4. The method of claim 1, wherein an N/2-th tone among the N consecutive tones is determined as the anchor tone.

5. The method of claim 1, wherein the anchor tone is predetermined by a base station or the transmitting UE based on selectivity of a channel carrying the positioning signal.

6. The method of claim 1, wherein the information regarding the sum of the measured phase differences between the reference signals corresponds to information regarding a phase difference between reference signals mapped to two tones with a virtual frequency interval, and
wherein the virtual frequency interval is greater than a maximum frequency difference between the N tones.

7. The method of claim 1, wherein the positioning information includes information regarding a sum of absolute values of the measured phase differences between the reference signals.

8. The method of claim 1, wherein the UE selects M consecutive tones from among the N consecutive tones included in the positioning signal, and wherein M is an integer less than N.

9. The method of claim 8, wherein the UE determines the anchor tone from among the M consecutive tones based on selectivity of a channel carrying the positioning information, and wherein the positioning information further includes information regarding a value of M and the determined anchor tone.

10. A method performed by a network in a wireless communication system supporting sidelink, the method comprising:
mapping reference signals to N consecutive tones (where N is an integer), respectively;
transmitting, to a user equipment (UE), a positioning signal including the N consecutive tones; and
receiving positioning information including information regarding phase differences between a reference signal mapped to an anchor tone corresponding to a standard tone among the N consecutive tones and reference signals respectively mapped to remaining tones, wherein the phase differences are measured by the UE,
wherein the positioning information includes information regarding a sum of the measured phase differences between the reference signals.

11. The method of claim 10, wherein the reference signals mapped to the N consecutive tones have same phase information.

12. The method of claim 10, wherein a sum of phases of the reference signals mapped to the N consecutive tones is predetermined.

13. The method of claim 10, wherein the positioning signal is transmitted by allocating highest transmit power to the anchor tone among the N consecutive tones.

14. The method of claim 10, wherein the positioning signal is transmitted by allocating highest transmit power to a first tone and an N-th tone among the N consecutive tones.

15. A device operating in a wireless communication system supporting sidelink, the device comprising:
   a processor; and
   a memory connected to the processor,
   wherein the processor is configured to:
   receive, from the memory, information regarding a positioning signal including N consecutive tones to which reference signals are mapped (wherein N is an integer), wherein the positioning signal is received from a network or a transmitting UE;
   measure phase differences between a reference signal mapped to an anchor tone corresponding to a standard tone among the N consecutive tones and reference signals respectively mapped to remaining tones; and
   generate the positioning information including information regarding the measured phase differences, and
   wherein the positioning information includes information regarding a sum of the measured phase differences between the reference signals.

16. The device of claim 15, wherein the processor is configured to receive a user input to switch a drive mode from an autonomous mode to a manual mode, or to switch from a manual mode to an autonomous mode.

* * * * *